(12) United States Patent
Tachi et al.

(10) Patent No.: US 8,795,835 B2
(45) Date of Patent: Aug. 5, 2014

(54) COATING METHOD AND COATED ARTICLE OBTAINED BY THE SAME

(75) Inventors: Kazuyuki Tachi, Nagoya (JP); Takeshi Narita, Toyoake (JP); Kanji Mori, Nagoya (JP); Satoshi Kodama, Nagoya (JP); Kazuyuki Kuwano, Toyota (JP); Akira Nishimura, Nagoya (JP)

(73) Assignees: Kabushiki Kaisha Toyota Chuo Kenkyusho, Aichi-gun (JP); Toyota Jidosha Kabushiki Kaisha, Toyota (JP)

( * ) Notice: Subject to any disclaimer, the term of this patent is extended or adjusted under 35 U.S.C. 154(b) by 1162 days.

(21) Appl. No.: 12/452,269

(22) PCT Filed: Jul. 3, 2008

(86) PCT No.: PCT/JP2008/062112
§ 371 (c)(1),
(2), (4) Date: Dec. 23, 2009

(87) PCT Pub. No.: WO2009/008338
PCT Pub. Date: Jan. 15, 2009

(65) Prior Publication Data
US 2010/0136342 A1    Jun. 3, 2010

(30) Foreign Application Priority Data

Jul. 6, 2007 (JP) ................ 2007-178682
Jul. 6, 2007 (JP) ................ 2007-178686
Mar. 5, 2008 (JP) ................ 2008-054675

(51) Int. Cl.
*B32B 9/04* (2006.01)
*B05D 3/02* (2006.01)
*B05D 7/00* (2006.01)

(52) U.S. Cl.
CPC .............. *B05D 7/532* (2013.01); *B05D 7/572* (2013.01); *B05D 7/50* (2013.01); *B05D 7/542* (2013.01); *B05D 7/56* (2013.01); *B05D 7/58* (2013.01); *B32B 9/045* (2013.01); *B05D 3/02* (2013.01); *B05D 7/582* (2013.01); *B32B 9/04* (2013.01); *B05D 3/0254* (2013.01)
USPC .................. 428/411.1; 427/407.1; 427/385.5

(58) Field of Classification Search
USPC ............................ 427/407.1, 372.2
See application file for complete search history.

(56) References Cited

U.S. PATENT DOCUMENTS

| 6,210,758 | B1 | 4/2001 | McNeil et al. |
| 6,818,303 | B2 | 11/2004 | Lassmann et al. |
| 2004/0086658 | A1 | 5/2004 | Onoyama et al. |
| 2007/0003699 | A1 | 1/2007 | Hosokawa et al. |

FOREIGN PATENT DOCUMENTS

| CN | 1844002 A | 10/2006 |
| DE | 100 27 290 C2 | 7/2002 |
| DE | 600 05 989 T2 | 9/2004 |
| GB | 2 399 520 A | 9/2004 |
| JP | A-05-068932 | 3/1993 |
| JP | A-10-113614 | 5/1998 |
| JP | A-10-277478 | 10/1998 |
| JP | A-10-296171 | 11/1998 |
| JP | A-2000-84463 | 3/2000 |
| JP | A-2002-35679 | 2/2002 |
| JP | A-2002-121462 | 4/2002 |
| JP | A-2002-153806 | 5/2002 |
| JP | A-2004-275966 | 10/2004 |
| JP | 2004-322029 A * | 11/2004 |
| JP | A-2004-322029 | 11/2004 |
| JP | 2005-000905 A * | 1/2005 |
| JP | A-2005-000905 | 1/2005 |
| JP | A-2005-177680 | 7/2005 |
| JP | A-2005-193107 | 7/2005 |
| JP | A-2005-211756 | 8/2005 |
| JP | A-2007-229671 | 9/2007 |

OTHER PUBLICATIONS

Aug. 22, 2012 Office Action issued in Chinese Patent Application No. 200880023715.1 (with English translation).
May 16, 2012 Notification of Reasons for Refusal issued in Japanese Patent Application No. 2008-175087 (with translation).
May 16, 2012 Notification of Reasons for Refusal issued in Japanese Patent Application No. 2008-175088 (with translation).
Mar. 1, 2012 Office Action issued in German Patent Application No. 11 2008 001 732.8 (with translation).
International Search Report mailed on Sep. 30, 2008 in corresponding International Application No. PCT/JP2008/062112.
International Preliminary Report on Patentability completed on Nov. 17, 2009 in corresponding International Application No. PCT/JP2008/062112.

* cited by examiner

*Primary Examiner* — William Phillip Fletcher, III
(74) *Attorney, Agent, or Firm* — Oliff PLC

(57) ABSTRACT

A coating method is a method for forming a multilayer coating film including at least one lower layer formed on a substrate and an uppermost layer formed on the lower layer, and the coating method comprises the steps of: preparing a certain curable coating material as an uppermost layer-coating material for forming the uppermost layer, and preparing a certain coating material as at least one lower layer-coating material for forming the lower layer; forming an uncured multilayer coating film by applying the lower layer-coating material and the uppermost layer-coating material on the substrate using a wet-on-wet technique; and curing at least the uppermost layer-coating material by subjecting the uncured multilayer coating film to a curing treatment.

20 Claims, 3 Drawing Sheets

COATING METHOD AND COATED ARTICLE OBTAINED BY THE SAME

TECHNICAL FIELD

The present invention relates to a coating method in which two or more kinds of coating materials are applied using a wet-on-wet technique and subjected to a curing treatment, and to a coated article obtained by the same.

BACKGROUND OF THE INVENTION

Conventionally, when a multilayer coating film is formed by a coating method in which two or more kinds of coating materials are applied using a wet-on-wet technique and then subjected to a curing treatment, thermosetting coating materials for forming layers constituting the multilayer coating film have been selected so that all the layers can be cured at the same heating temperature after all the coating materials are applied, and then the multilayer coating film as a whole has been cured. In this case, there has been a problem that the obtained multilayer coating film is inferior in surface texture and gloss to that obtained by baking a lower layer and then applying and baking coating materials for forming an uppermost layer. In this connection, various methods have been proposed to improve the surface texture and the gloss of a multilayer coating film.

For example, Japanese Unexamined Patent Application Publication No. Hei 10-277478 (Document 1) discloses a method for forming a coating film in which a color base coating material, a base coating material containing an effect pigment (a metal pigment and/or a luster pigment) and a clear coating material are sequentially applied using a wet-on-wet technique, and then a baking treatment is performed to cure each layer. In this method, the coating materials are adjusted so that the viscosity-increase starting times for the color base coating material, the base coating material containing an effect pigment (a metal pigment and/or a luster pigment), and the clear coating material would be longer in this order. Thus, before the viscosity of the clear coating material for forming the uppermost layer increases along with the curing, the color base coating material and the base coating material containing an effect pigment (a metal pigment and/or a luster pigment) for forming the lower layers start to be cured.

Japanese Unexamined Patent Application Publication No. 2002-35679 (Document 2) discloses a method for forming a coating film in which an intermediate coating material, a base coating material and a clear coating material are sequentially applied to an electrodeposition-coated substrate, and then the three layers are simultaneously cured by baking. In this method, an excellent finished appearance can be achieved by using the coating materials satisfying the conditions that when measured using each of coating materials which contain 90% by mass of non-volatile content, the minimum viscosities with respect to temperature satisfy the relationship: the intermediate coating material ≥ the base coating material ≥ the clear coating material; and the curing start temperatures satisfy the relationship: the intermediate coating material ≤ the base coating material ≤ the clear coating material.

Japanese Unexamined Patent Application Publication No. 2005-177680 (Document 3) discloses a coating method in which, when an intermediate coating material and a top coating material are applied using a wet-on-wet technique and then simultaneously baked, the intermediate coating film is cured prior to the curing of the top coating film by taking an advantage of the difference in curing rate. By this coating method, the image clarity can be reliably ensured.

Japanese Unexamined Patent Application Publication No. 2005-193107 (Document 4) discloses a coating method in which an intermediate coating material and a top coating material are applied using a wet-on-wet technique and then simultaneously cured. Here, a reduction in the smoothness of the top coating film attributable to the mixing between the intermediate coating film layer and the top coating film layer is considered as the cause of inferior surface texture and gloss of the multilayer coating film. Hence, in this method, in order to prevent the mixing, after the intermediate coating material is applied, a curing catalyst for accelerating the curing of the intermediate coating film layer is applied to an uncured surface of the intermediate coating film layer.

Meanwhile, it is known that the cause of reduced surface texture and gloss of a multilayer coating film is a residual of a solvent in the multilayer coating film prior to curing by baking. Particularly, if the solvent in the multilayer coating film is rapidly evaporated during a curing reaction, the surface of the multilayer coating film is roughened. In order to prevent this, the following methods have been proposed. For example, Japanese Unexamined Patent Application Publication No. 2000-84463 (Document 5) discloses a method for forming a coating film based on two-stage heating, the method comprising the steps of: applying a thermosetting coating material solution; performing heating at a low temperature; and performing heating at a high temperature. Moreover, Japanese Unexamined Patent Application Publication No. 2004-275966 (Document 6) discloses a method for forming a coating film comprising the steps of: sequentially applying an intermediate coating material, a base coating material and a clear coating material using a wet-on-wet technique; and performing a heat treatment in two stages including a low-temperature heating stage and a high-temperature heating stage. In these methods, a solvent in a coating material is gradually evaporated without curing the coating material at the low-temperature heating stage; thereafter, a thermosetting resin contained in the coating material of each layer is cured at the high-temperature heating stage.

As described above, various methods have been proposed heretofore to improve the surface texture and gloss of a multilayer coating film. However, coated articles more excellent in appearance quality are demanded as to, for example, steel plates for automobile, and the like. Accordingly, a further improvement in a wet-on-wet coating method is ever desired.

DISCLOSURE OF THE INVENTION

The present invention has been made in view of the above-described problems of the conventional techniques. An object of the present invention is to provide a coating method capable of obtaining a multilayer coating film including an uppermost layer with less surface unevenness even when two or more kinds of coating materials are applied using a wet-on-wet technique and at least the uppermost layer is cured to ensure a high durability or the like. Another object of the present invention is to provide a coated article that is obtained by the same and excellent in appearance quality.

The present inventors have earnestly studied to achieve the above object, and consequently found out the following facts. Specifically, by forming at least one lower layer, which is located below an uppermost layer within a multilayer coating film, by use of a noncurable coating material that undergoes no curing reaction by a heat treatment, the shrinkage of the multilayer coating film can be minimized after the uppermost layer is cured and thus the fluidity thereof significantly decreases. In addition, even when two or more kinds of coating materials are applied using a wet-on-wet technique and then baked, a multilayer coating film excellent in appearance quality can be obtained. Based on these facts, the inventors succeeded in completing a first coating method of the present invention.

Specifically, the first coating method of the present invention is a coating method for forming a multilayer coating film including at least one lower layer formed on a substrate and an uppermost layer formed on the lower layer, and the coating method comprises the steps of:

preparing a noncurable coating material, which undergoes no curing reaction by a heat treatment, as at least one lower layer-coating material for forming the lower layer, and preparing a thermosetting coating material as an uppermost layer-coating material for forming the uppermost layer;

forming an uncured multilayer coating film by applying the lower layer-coating material and the uppermost layer-coating material on the substrate using a wet-on-wet technique; and curing at least the uppermost layer-coating material by subjecting the uncured multilayer coating film to the heat treatment.

As the noncurable coating material, a coating material having a weight loss percentage of 0.5% by mass or less at a curing temperature of the uppermost layer-coating material is preferable, and a coating material containing no curing agent is more preferable.

In the case where two or more of the lower layers are provided, all lower layer-coating materials for forming the lower layers are preferably each the noncurable coating material.

The uppermost layer-coating material is preferably a coating material having a weight loss percentage of 0.5% by mass or less at a curing temperature thereof, and more preferably a coating material that forms no volatile product in the curing reaction by the heat treatment.

In the first coating method, it is preferable that at least the uppermost layer-coating material be cured by reducing a concentration of a volatile component in the uncured multilayer coating film to 3.5% by mass or less, and by then subjecting the uncured multilayer coating film to a heat treatment at a temperature equal to or above [a curing temperature of the uppermost layer-coating material–20° C.]. Moreover, it is also preferable that the uncured multilayer coating film be subjected to a heat treatment at a temperature below [a curing temperature of the uppermost layer-coating material–20° C.], and then subjected to a heat treatment at the temperature equal to or above [the curing temperature of the uppermost layer-coating material–20° C.].

Furthermore, the present inventors have revealed the following facts. Specifically, by using a thermosetting coating material as an uppermost layer-coating material for forming an uppermost layer in a multilayer coating film, wherein the thermosetting coating material forms no volatile product in a curing reaction by a heat treatment, using a thermosetting coating material as at least one lower layer-coating material for forming a lower layer, wherein the thermosetting coating material has a curing temperature lower than a curing temperature of the uppermost layer-coating material, applying these coating materials using a wet-on-wet technique, thereafter curing the lower layer-thermosetting coating material by the heat treatment, and then by curing the uppermost layer-thermosetting coating material by the heat treatment at a higher temperature, the shrinkage of the multilayer coating film can be minimized after the uppermost layer is cured and thus the fluidity thereof significantly decreases. Moreover, even when two or more kinds of coating materials are applied using a wet-on-wet technique and baked, a multilayer coating film excellent in appearance quality can be obtained. This discovery has led the inventors to complete a second coating method of the present invention.

Specifically, the second coating method of the present invention is a coating method for forming a multilayer coating film including at least one lower layer formed on a substrate and an uppermost layer formed on the lower layer, and the coating method comprises the steps of:

preparing a thermosetting coating material as an uppermost layer-coating material for forming the uppermost layer, wherein the thermosetting coating material has a curing temperature $T_T$ of 40° C. to 200° C. both inclusive and forms no volatile product in a curing reaction by a heat treatment, and preparing a lower layer-thermosetting coating material as at least one lower layer-coating material for forming the lower layer, wherein the lower layer-thermosetting coating material has a curing temperature $T_U$ that satisfies the following formula (1):

$$T_U \leq T_T - 30 \tag{1}$$

(in the formula (1), $T_U$ represents a curing temperature [° C.] of the lower layer-thermosetting coating material, and $T_T$ represents the curing temperature [° C.] of the uppermost layer-thermosetting coating material);

forming an uncured multilayer coating film by applying the lower layer-coating material and the uppermost layer-coating material on the substrate using a wet-on-wet technique;

setting heating temperatures $T_L$ and $T_H$ that satisfy the following formula (2):

$$T_U - 20 \leq T_L \leq T_T - 30 \tag{2},$$

and the following formula (3):

$$T_T - 20 \leq T_H \leq T_T + 40 \tag{3}$$

(in the formulas (2) and (3), $T_L$ represents a temperature [° C.] for low temperature heating, $T_H$ represents a temperature [° C.] for high temperature heating, and $T_U$ and $T_T$ are the same as $T_U$ and $T_T$ in the formula (1)); and forming a multilayer coating film including the uncured uppermost layer by subjecting the uncured multilayer coating film to the heat treatment at the temperature $T_L$ to thus cure at least the lower layer-thermosetting coating material, and then curing the uppermost layer-thermosetting coating material by subjecting the multilayer coating film including the uncured uppermost layer to the heat treatment at the temperature $T_H$.

The uppermost layer-thermosetting coating material is preferably a coating material having a weight loss percentage of 0.5% by mass or less at the temperature $T_T$.

In a case where two or more of the lower layers are provided, all lower layer-coating materials for forming the lower layers are preferably each the lower layer-thermosetting coating material.

In the second coating method, it is preferable that the uppermost layer-coating material be cured by reducing a concentration of a volatile component in the multilayer coating film including the uncured uppermost layer to 4% by mass or less, and by then subjecting the multilayer coating film including the uncured uppermost layer to the heat treatment at the temperature $T_H$.

Furthermore, the present inventors have found out the following facts. Specifically, by forming at least one lower layer, which is located below an uppermost layer within a multilayer coating film, by use of a lower layer-coating material having a relative loss elastic modulus of a predetermined value or less when an uppermost layer-coating material starts to gel, the fluidity of the lower layer formed by using the lower layer-coating material is ensured even when the uppermost layer starts to gel, and thereby it is possible to minimize the formation of unevenness due to the shrinkage of the multilayer coating film after the uppermost layer is cured and thus the fluidity thereof significantly decreases. Moreover, even when two or more kinds of coating materials are applied using a wet-on-wet technique and subjected to a curing treatment, a multilayer coating film excellent in appearance quality can be obtained. Based on these facts, the inventors succeeded in completing a third coating method of the present invention.

Specifically, the third coating method of the present invention is a coating method for forming a multilayer coating film including at least one lower layer formed on a substrate and an uppermost layer formed on the lower layer, and the coating method comprises the steps of:

preparing a curable coating material as an uppermost layer-coating material for forming the uppermost layer, wherein the curable coating material forms a cross-linked structure by a chemical reaction, and preparing a coating material as at least one lower layer-coating material for forming the lower layer, wherein the coating material has a relative loss elastic modulus of $1\ s^{-2}$ or less when the uppermost layer-coating material starts to gel;

forming an uncured multilayer coating film by applying the lower layer-coating material and the uppermost layer-coating material on the substrate using a wet-on-wet technique; and curing at least the uppermost layer-coating material by subjecting the uncured multilayer coating film to a curing treatment.

In the third coating method, it is preferable that the uppermost layer-coating material used be a thermosetting coating material, and that the curing treatment be a curing treatment by heating. Moreover, as the uppermost layer-coating material, a coating material having a weight loss percentage of 0.5% by mass or less at a curing temperature thereof is preferable.

Further, in the third coating method, as the coating material having a relative loss elastic modulus of $1\ s^{-2}$ or less, a coating material having a weight loss percentage of 0.5% by mass or less at a curing temperature of the uppermost layer-coating material is preferable, and a noncurable coating material that forms no cross-linked structure is also preferable.

In a case where two or more of the lower layers are provided, all lower layer-coating materials for forming the lower layers are preferably each the coating material having a relative loss elastic modulus of $1\ s^{-2}$ or less.

Furthermore, a coated article of the present invention comprises a multilayer coating film including at least one lower layer formed on a substrate and an uppermost layer formed on the lower layer, wherein the coated article is obtained by the coating method according to any one of the first to third coating methods. Such a coated article is excellent in appearance quality such as surface texture and gloss.

Here, it is not known exactly why the surface unevenness of the multilayer coating film is reduced by the coating methods of the present invention even when two or more kinds of coating materials are applied using a wet-on-wet technique and subjected to a curing treatment. However, the present inventors speculate as follows. Specifically, in a multilayer coating film formed using a conventional wet-on-wet technique, thermosetting coating materials for forming all layers including an uppermost layer are each selected so that a curing reaction occurs at the same heating temperature in the layers. The multilayer coating film is designed so that the layers are cured at the same heating temperature, or curing is started sequentially from a lower layer. Accordingly, when the thermosetting coating material for forming the uppermost layer is cured by a heat treatment, curing of the thermosetting coating material proceeds also in the lower layer below the uppermost layer, and the lower layer loses the fluidity. In each layer of the multilayer coating film, the thermosetting coating material is cured by a condensation reaction or by an addition reaction after the deblocking reaction of a curing agent. Accordingly, a volatile product formed in this condensation reaction or deblocking reaction evaporates along with the residual solvent. This causes the shrinkage of the multilayer coating film, and thereby unevenness is formed on the surface of the coating film. This surface unevenness of the coating film is reduced by the flowing or the like of the layers that keep having sufficient fluidity. However, when the fluidity of the layers, particularly that of the uppermost layer, significantly decreases because of the curing, the lower layer is also cured and substantially loses the fluidity. As a result, the unevenness is not reduced, and unevenness on the surface of the substrate or on an interface between layers is transferred to the surface of the uppermost layer. The present inventors speculate that the surface texture and gloss of the multilayer coating film are deteriorated by the above phenomenon.

In contrast, in the first coating method of the present invention, at least one lower layer is formed by using a noncurable coating material. Accordingly, even when an uppermost layer is formed by using a thermosetting coating material and then the thermosetting coating material is cured by a heat treatment, substantially no curing reaction occurs in the lower layer formed by using the noncurable coating material; thus, substantially no volatile product is formed. As a result, the evaporation of a volatile product influencing the shrinkage of the multilayer coating film as in a conventional way does not occur. Thus, the present inventors speculate that the shrinkage of the multilayer coating film can be minimized and limited only to that occurring due to the evaporation of a residual solvent.

Moreover, in the second coating method of the present invention, first, a thermosetting coating material for forming a lower layer is cured by subjecting the lower layer to a heat treatment at such a temperature that a thermosetting coating material for forming an uppermost layer would not substantially be cured. Next, the thermosetting coating material for forming the uppermost layer is subjected to a heat treatment at a higher temperature and thereby cured. In this method, in curing the uppermost layer, the curing of the lower layer has already proceeded considerably. Accordingly, the present inventors speculate that the amount of a volatile product formed in the lower layer is reduced, and that the shrinkage of the lower layer is restrained. In addition, a thermosetting coating material that forms substantially no volatile product in the curing reaction is used as the uppermost layer-thermosetting coating material. Accordingly, the present inventors speculate that substantially no volatile product evaporates even in curing the uppermost layer, and that the shrinkage which is due to evaporation of a volatile product influencing the surface morphology of the multilayer coating film does not occur.

Furthermore, in the third coating method of the present invention, at least one lower layer is formed by using a lower layer-coating material having a relative loss elastic modulus of a predetermined value or less when an uppermost layer-coating material starts to gel. Accordingly, the present inventors speculate that the fluidity of the lower layer formed by using the lower layer-coating material is ensured even when the uppermost layer is cured. Thus, even when unevenness is formed on the surface of the multilayer coating film due to shrinkage of the coating film, the unevenness is reduced by the flowing of this lower layer. Consequently, significant existence of the unevenness on the surface of the coating film is restrained.

Note that, in the present invention, the phrases "substantially no volatile product is formed" and "substantially no volatile product evaporates" include a case where a volatile product is formed and evaporates to the extent that shrinkage of a coating film due to the evaporation of the volatile product does not influence the surface morphology of the coating film. Specifically, even when a volatile product is formed and evaporates through a heat treatment performed on a coating material, this coating material is assumed to form and evaporate substantially no volatile product if the coating film has a weight loss percentage of 0.5% by mass or less.

Moreover, in the present invention, the terms "curing temperature of a coating material," "weight loss percentage of a coating material," "relative loss elastic modulus when an uppermost layer-coating material starts to gel" and "concentration of a volatile component in a multilayer coating film" represent as follows.

The term "curing temperature of a coating material" refers to a temperature at which the curing of the coating material can be performed most efficiently in relation to other curing conditions such as curing time, in the case where a target coating material is applied on the substrate, curing treatment such as heat treatment is performed, and the coating film is cured to be fixed on the substrate. In general, this term refers to a baking temperature which is set (designed) for each coating material. In the present invention, a value listed in its catalog can be employed as this curing temperature (baking temperature).

The term "weight loss percentage of a coating material" refers to a value determined by the following method. Specifically, a target coating material is applied on aluminum foil so that the film thickness of the coating material after curing treatment will be a target film thickness in the multilayer coating film. The obtained aluminum foil sample is dried at a temperature, which is lower than the curing temperature $T_T$ of the uppermost layer-coating material by 40° C. [$T_T$−40° C.], under the vacuum condition of $10^{-2}$ Torr or less for 90 minutes. Thereafter, the sample is heated at the curing temperature $T_T$ of the uppermost layer-coating material for 30 minutes by using a gas chromatograph/mass spectrometer (for example, 6890GC/5975MSD manufactured by Agilent Technologies, Inc.) equipped with a thermal desorption introduction system (for example, Thermal Desorption System manufactured by GERSTEL K.K.) to quantitatively determine the amount of a volatile product (Rc (unit: g)) and the amount of the residual solvent in the sample. Then, the weight loss percentage is calculated by the formula (4). The weight loss percentage is a percentage of the amount of the volatile product relative to the total amount of binder in the coating film.

$$\text{Weight loss percentage} = 100 \times Rc/W \times 100/(100-P) \quad (4)$$

In the formula (4), W is the mass (unit: g) of the coating film obtained in the vacuum drying step, and P is the mass (unit: g) of a pigment contained in 100 g of the coating film. Note that the value in the composition table (the value described in its catalog or the like) of the coating material can be employed as the mass of the pigment.

The term "relative loss elastic modulus when an uppermost layer-coating material starts to gel" is defined by a relative loss elastic modulus which is determined by the following method. Specifically, first, an uppermost layer-coating material is applied to a stainless steel plate of 40 mm×50 mm (thickness: 0.5 mm) so that the film thickness of the coating material after a curing treatment would be 35±5 μm. To be more specific, the stainless steel plate is put on a horizontal table, and an adhesive tape having a thickness of 70 μm is pasted on a region of the stainless steel plate, the region being located approximately 5 mm inward of an edge of each of two opposing sides of the stainless steel plate. By sliding a knife with a straight edge onto the tape, the uppermost layer-coating material is applied into a gap between the stainless steel plate and the knife edge.

The relative storage elastic modulus ($E_r'$) of the coating film made from the uppermost layer-coating material is measured, 7±1 minutes after the coating film is formed in this manner. The measurement is made using a rigid-body pendulum type physical properties testing instrument (model: RPT-5000 manufactured by A&D Company, Limited) provided with an annular pendulum having a diameter of 74 mm to which a knife-edge having an edge angle of 40° is attached. The temperature program at the time of the measurement is set so that the temperature is increased from room temperature (25° C.) to the curing temperature of the uppermost layer-coating material at a rate of temperature rise of 20±4° C./minute, and then the curing temperature is maintained.

The measured values of the relative storage elastic modulus ($E_r'$) are plotted against time. As shown in FIG. 1, the result in which the plotted line changes from a downwardly convex curve to an upwardly convex curve in the course of time (hereinafter, the time point of this change (the point P in FIG. 1) is referred to as an "inflection point") is obtained. The part of the measured values acquired over 15 minutes from this inflection point is fitted to the following formula (5):

$$E_r' = A[1-\exp\{k(t-t_d)\}] \quad (5)$$

(in the formula (5), A and k are constant, and t represents time) to determine a time-axis intercept $t_d$ according to the nonlinear least-squares method. This $t_d$ represents the time from when the measurement is started to when the uppermost layer-coating material starts to gel.

Next, a coating film of a target lower layer-coating material is formed in the same manner as in the case of the uppermost layer-coating material, and then the relative loss elastic modulus ($E_r''$) of the lower layer-coating material is measured under the same condition as that in the case of the uppermost layer-coating material. From this measured result, the relative loss elastic modulus ($E_r''$) at the time $t_d$ is determined, and this is defined as the "relative loss elastic modulus when an uppermost layer-coating material starts to gel".

Note that, the relative storage elastic modulus ($E_r'$) and the relative loss elastic modulus ($E_r''$) can be associated with a general storage elastic modulus (E') and a general relative loss elastic modulus (E") in the following formulas:

$$E_r' = BE' \text{ and}$$

$$E_r'' = BE'',$$

respectively. Here, B is a value determined according to measurement conditions, and is expressed by the following formula:

$$B = (bh^2 \cos\phi)/(I \sin^3\theta)$$

(in the formula, b represents the contact length [unit: m] between the coating film and the knife edge, h represents the film thickness [unit: m] of the coating film, φ represents the angle between the surface of the knife edge of the pendulum at rest and the surface of the substrate (the stainless steel plate in the aforementioned case), and I represents the rotational moment of inertia [unit: kg·m²] around the knife edge of the pendulum).

Thus, when the measurement conditions are fixed, B is a constant value.

The term "concentration of a volatile component in a multilayer coating film" is a value calculated according to the formula (6):

$$V=(Wt-We)/Wt\times 100 \quad (6)$$

In the formula (6), V represents the concentration of a volatile component (unit: % by mass) in the multilayer coating film, Wt represents the mass (unit: g) of the multilayer coating film at a given heat treatment time t, and We represents the mass (unit: g) of the multilayer coating film finally obtained.

According to the present invention, even when two or more kinds of coating materials are applied using a wet-on-wet technique and at least an uppermost layer is cured for ensuring a high durability and the like, a multilayer coating film including the uppermost layer with less surface unevenness can be obtained. This makes it possible to obtain a coated article excellent in appearance quality such as surface texture (surface smoothness) and gloss.

DETAILED DESCRIPTION OF THE PREFERRED EMBODIMENTS

Figure 1:
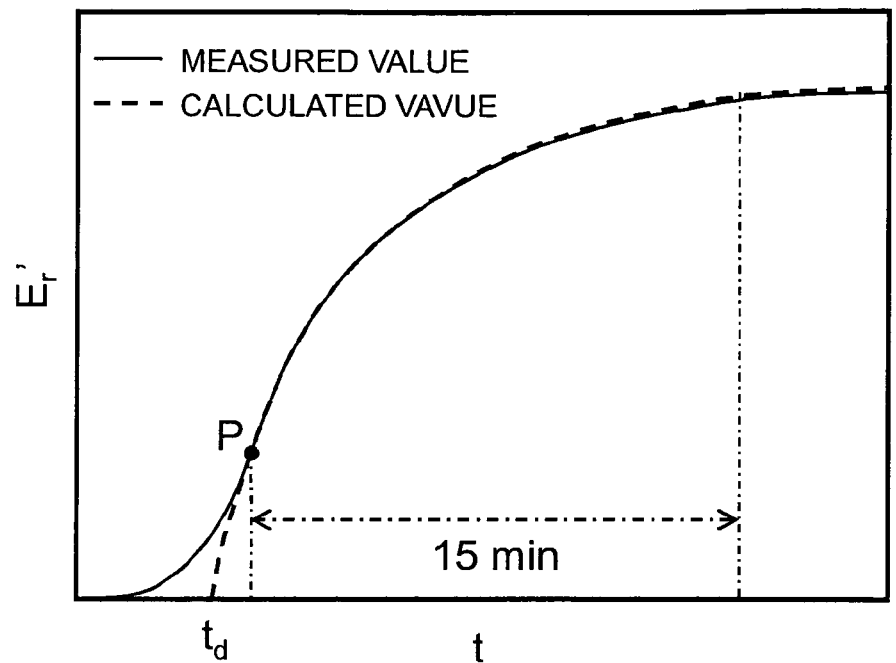
FIG. 1 is a graph schematically showing the change in a relative storage elastic modulus (Er') over time.

Hereinafter, the present invention will be described in details on the basis of preferred embodiments thereof.

<First Coating Method>

A first coating method of the present invention is a coating method for forming a multilayer coating film including at least one lower layer formed on a substrate and an uppermost layer formed on the lower layer, and the coating method comprises the steps of:

preparing a noncurable coating material, which undergoes no curing reaction by a heat treatment, as at least one lower layer-coating material for forming the lower layer, and preparing a thermosetting coating material as an uppermost layer-coating material for forming the uppermost layer;

forming an uncured multilayer coating film by applying the lower layer-coating material and the uppermost layer-coating material on the substrate using a wet-on-wet technique; and curing at least the uppermost layer-coating material by subjecting the uncured multilayer coating film to the heat treatment.

In the first coating method, one or more kinds of lower layer-coating materials are applied on the substrate, and then a solvent and the like are evaporated by drying or the like when needed. Thus, an uncured lower layer is formed. Next, the uppermost layer-coating material is applied on the uncured lower layer, and then a solvent and the like are evaporated by drying or the like when needed. Thus, an uncured uppermost layer is formed. Thereafter, the uncured multilayer coating film thus obtained is subjected to a heat treatment, and at least the uppermost layer-coating material is cured.

The substrate used in the first coating method is not particularly limited. Examples of the substrate include metals (such as iron, copper, aluminum, tin, and zinc, as well as alloys of these metals), steel plates, plastics, foamed materials, paper, wood, cloth, and glass. Of those, the present invention is preferably adopted for steel plates for automobile, for which a high appearance quality is required. Surfaces of these substrates may be subjected to a treatment such as electrodeposition-coating in advance.

In the first coating method, at least one lower layer is formed on the substrate. At least one lower layer is formed by using a noncurable coating material that undergoes no curing reaction by a heat treatment as a lower layer-coating material. Specifically, when one lower layer is provided, this lower layer is formed by using the noncurable coating material. When two or more lower layers are provided, at least one layer thereof is formed by using the noncurable coating material. When two or more lower layers are provided, all the lower layers are preferably formed by using the noncurable coating materials in view of capability of reducing the shrinkage of the multilayer coating film.

In the first coating method, the noncurable coating material that undergoes no curing reaction by a heat treatment can be any noncurable coating material, as long as substantially no curing reaction by a heat treatment occurs in the noncurable coating material. The noncurable coating material preferably has a weight loss percentage of 0.5% by mass or less, more preferably 0.3% by mass or less, and particularly preferably 0.1% by mass or less, at the curing temperature of the uppermost layer-coating material to be used. The use of such a noncurable coating material having a low percentage of weight loss due to the heat treatment leads to the tendency to reduce the shrinkage of the multilayer coating film after the fluidity of the uppermost layer significantly decreases because of the curing. Furthermore, from such viewpoints, a coating material containing a resin capable of being formed into a coating film, but not containing a curing agent, is most preferable. In addition, as the noncurable coating material, a coating material having a relative loss elastic modulus of 1 $s^{-2}$ or less (more preferably 0.9 $s^{-2}$ or less, and particularly preferably 0.8 $s^{-2}$ or less) when the employed uppermost layer-coating material starts to gel tends to be preferable.

The resin which is contained in the noncurable coating material, and which is capable of being formed into a coating film, can be any resin, as long as the resin alone undergoes no curing reaction by the heat treatment. Examples thereof include resin components obtained by excluding a curing agent from an intermediate coating material, a base coating material, and the like described in, for example, Japanese Unexamined Patent Application Publication No. 2004-275966. Specific examples of the resin include acrylic resins, polyester resins, alkyd resins, epoxy resins, and urethane resins; however, the resin is not limited thereto. Further, two or more kinds of these resins, which undergo no curing reaction by the heat treatment, may be selected for use in combination.

In the first coating method, when two or more lower layers are provided, as long as at least one layer is a layer formed by using the noncurable coating material, the other layer(s) may be formed by using a thermosetting coating material.

As the lower layer-thermosetting coating material, a thermosetting coating material used for ordinary baking finish can be used, and examples thereof include an intermediate coating material and a base coating material described in Japanese Unexamined Patent Application Publication No. 2004-275966. Moreover, the smaller the weight loss percentage of the lower layer-thermosetting coating material at the curing temperature of the employed uppermost layer-coating material is, the more preferable the lower layer-thermosetting coating material becomes, from the viewpoint of capability of minimizing the shrinkage of the coating film after the uppermost layer is cured by the heat treatment and thus the fluidity thereof significantly decreases.

Specific examples of the lower layer-thermosetting coating material include thermosetting coating materials containing a thermosetting resin such as an acrylic resin, a polyester resin, an alkyd resin, an epoxy resin, or a urethane resin; and a curing agent such as an amine compound, an amino resin, an isocyanate compound, or an isocyanate resin. However, the lower layer-thermosetting coating material is not limited thereto. The above-described thermosetting resins and curing agents may be used alone or in combination of two or more kinds.

In the first coating method, a thermosetting coating material is used as the uppermost layer-coating material. The uppermost layer-thermosetting coating material can be any thermosetting coating material, as long as the thermosetting coating material contains a thermosetting resin capable of being formed into a coating film, and a curing agent (for example, a compound or a resin having, in one molecule, two or more functional groups capable of reacting with functional groups of the thermosetting resin). Examples of the uppermost layer-thermosetting coating material include thermosetting coating materials used as an uppermost layer-coating material for ordinary baking finish (for example, clear coating materials described in Japanese Unexamined Patent Application Publication No. 2004-275966). The curing temperature of the uppermost layer-thermosetting coating material is not particularly limited; however, the curing temperature is normally 40 to 200° C., and preferably 60 to 160° C.

Examples of the thermosetting resin which is contained in the uppermost layer-coating material, and which is capable of being formed into a coating film, include acrylic resins, polyester resins, alkyd resins, epoxy resins, and urethane resins; however, the thermosetting resin is not limited thereto. Examples of preferable curing agents include amine compounds, amino resins, isocyanate compounds, and isocyanate resins; however, the curing agent is not limited thereto. These resins and curing agents may be used alone or in combination of two or more kinds.

In the first coating method, the uppermost layer-coating material is preferably a coating material that forms substantially no volatile product in the curing reaction by the heat treatment. Such a coating material preferably has a weight loss percentage of 0.5% by mass or less, more preferably 0.3% by mass or less, and particularly preferably 0.1% by mass or less, at the curing temperature thereof. The use of such a thermosetting coating material having a low weight loss percentage as the uppermost layer-coating material leads to the tendency to minimize the shrinkage of the coating film by the heat treatment. In addition, from such viewpoints, a coating material that forms no volatile product (having a weight loss percentage of 0% by mass) is most preferable.

Examples of a combination of the thermosetting resin with the curing agent, from which no volatile product is formed in the curing reaction by the heat treatment, include a combination of a hydroxy group-containing acrylic resin with an isocyanate compound and/or an isocyanate resin, and a combination of an epoxy group-containing acrylic resin with a polyvalent carboxylic acid compound and/or a carboxyl group-containing resin.

In the first coating method of the present invention, first, the lower layer-coating material is applied on the substrate, and then a solvent is evaporated by drying or the like when needed. Thus, an uncured lower layer is formed. At this time, when one lower layer is provided, this lower layer is formed by using the noncurable coating material. When two or more lower layers are provided, at least one layer is formed by using the noncurable coating material, and the other layer(s) may be formed by using the lower layer-thermosetting coating material. However, in view of capability of minimizing the shrinkage of the multilayer coating film, all the lower layers are preferably formed by using the noncurable coating material. Meanwhile, when two or more lower layers are formed, the layer using the noncurable coating material may be formed at any position.

Next, the uppermost layer-coating material is applied on the uncured lower layer, and then a solvent is evaporated by drying or the like when needed. Thus, an uncured uppermost layer is formed.

Then, an uncured multilayer coating film formed by applying the lower layer-coating material and the uppermost layer-coating material using a wet-on-wet technique is subjected to a heat treatment to thus cure at least the uppermost layer-coating material.

In the first coating method, the heat treatment preferably includes a heat treatment at or above a temperature at which at least the uppermost layer is cured, for example, at or above a temperature of [the curing temperature of the uppermost layer-coating material−20° C.] (hereinafter, this heat treatment is referred to as a "high-temperature heat treatment"). The temperature for the high temperature heating is further preferably within the temperature range of [the curing temperature of the uppermost layer-coating material±20° C.]. Specifically, when the curing temperature of the uppermost layer-coating material is 140° C., the temperature for the high temperature heating is preferably 120° C. or above, and more preferably 120° C. to 160° C. both inclusive. The duration for the high temperature heating is preferably 50% to 150% both inclusive, and more preferably 60% to 100% both inclusive, of the curing time of the uppermost layer-coating material. Specifically, when the curing time of the uppermost layer-coating material is 30 minutes, the duration for the high temperature heating is preferably 15 minutes to 45 minutes both inclusive, and more preferably 18 minutes to 30 minutes both inclusive.

Moreover, in the first coating method, it is preferable to reduce, without curing the uppermost layer, the concentration of a volatile component in the multilayer coating film to 3.5% by mass or less, more preferably 3% by mass or less, and particularly preferably 2% by mass or less, before the high-temperature heat treatment is performed. This leads to the tendency to minimize the shrinkage of the multilayer coating film after the uppermost layer is cured by the high-temperature heat treatment and thus the fluidity thereof significantly decreases.

As a method for reducing the concentration of a volatile component in the multilayer coating film without curing the uppermost layer, preferred is a method in which a heat treatment is performed at the temperature below [the curing temperature of the uppermost layer-coating material−20° C.] (hereinafter, this heat treatment is referred to as a "low-temperature heat treatment"). The temperature for the low temperature heating is further preferably a temperature below [the curing temperature of the uppermost layer-coating material–30° C.], and particularly preferably a temperature below [the curing temperature of the uppermost layer-coating material–40° C.] Specifically, when the curing temperature of the uppermost layer-coating material is 140° C., the temperature for the low temperature heating is preferably below 120° C., more preferably below 110° C., and particularly preferably below 100° C. The duration for the low temperature heating is preferably 10% inclusive to 50% exclusive, and more preferably 20% to 40% both inclusive, of the curing time of the uppermost layer-coating material. Specifically, when the curing time of the uppermost layer-coating material is 30 minutes, the duration for the low temperature heating is preferably 3 minutes to 15 minutes both inclusive, and more preferably 6 minutes to 12 minutes both inclusive. When the uncured multilayer coating film is subjected to a heat treatment in the ranges of the temperature for the low temperature heating and the duration for the low temperature heating, there is a tendency that the concentration of a volatile component in the multilayer coating film can be reduced without substantially curing the uppermost layer.

<Second Coating Method>

A second coating method of the present invention is a coating method for forming a multilayer coating film including at least one lower layer formed on a substrate and an uppermost layer formed on the lower layer, and the coating method comprises the steps of:

preparing a thermosetting coating material as an uppermost layer-coating material for forming the uppermost layer, wherein the thermosetting coating material has a curing temperature $T_T$ of 40° C. to 200° C. both inclusive and forms no volatile product in a curing reaction by a heat treatment, and preparing a lower layer-thermosetting coating material as at least one lower layer-coating material for forming the lower layer, wherein the lower layer-thermosetting coating material has a curing temperature $T_U$ that satisfies the following formula (1):

$$T_U \leq T_T - 30 \quad (1)$$

(in the formula (1), $T_U$ represents a curing temperature [° C.] of the lower layer-thermosetting coating material, and $T_T$ represents the curing temperature [° C.] of the uppermost layer-thermosetting coating material);

forming an uncured multilayer coating film by applying the lower layer-coating material and the uppermost layer-coating material on the substrate using a wet-on-wet technique;

setting heating temperatures $T_L$ and $T_H$ that satisfy the following formula (2):

$$T_U - 20 \leq T_L \leq T_T - 30 \quad (2),$$

and the following formula (3):

$$T_T - 20 \leq T_H \leq T_T + 40 \quad (3)$$

(in the formulas (2) and (3), $T_L$ represents a temperature [° C.] for low temperature heating, $T_H$ represents a temperature [° C.] for high temperature heating, and $T_U$ and $T_T$ are the same as $T_U$ and $T_T$ in the formula (1)); and forming a multilayer coating film including the uncured uppermost layer by subjecting the uncured multilayer coating film to the heat treatment at the temperature $T_L$ (hereinafter, this heat treatment is also referred to as a "low-temperature heat treatment") to thus cure at least the lower layer-thermosetting coating material, and then curing the uppermost layer-thermosetting coating material by subjecting the multilayer coating film including the uncured uppermost layer to the heat treatment at the temperature $T_H$ (hereinafter, this heat treatment is also referred to as a "high-temperature heat treatment").

In the second coating method, one or more kinds of lower layer-thermosetting coating materials are applied on the substrate, and then a solvent and the like are evaporated by drying or the like when needed. Thus, an uncured lower layer is formed. Next, the uppermost layer-thermosetting coating material is applied on the uncured lower layer, and then a solvent and the like are evaporated by drying or the like when needed. Thus, an uncured uppermost layer is formed. Thereafter, the uncured multilayer coating film thus obtained is subjected to the low-temperature heat treatment, and at least the lower layer-thermosetting coating material is cured. After that, the uppermost layer-thermosetting coating material is subjected to the high-temperature heat treatment and thus cured.

The substrate used in the second coating method is not particularly limited. Examples of the substrate include metals (such as iron, copper, aluminum, tin, and zinc, as well as alloys of these metals), steel plates, plastics, foamed materials, paper, wood, cloth, and glass. Of those, the present invention is preferably adopted for steel plates for automobile, for which a high appearance quality is required. Surfaces of these substrates may be subjected to a treatment such as electrodeposition-coating in advance.

In the second coating method, at least one lower layer is formed on the substrate. At least one lower layer is formed by using a thermosetting coating material, wherein the thermosetting coating material has a curing temperature that satisfies the above formula (1). Specifically, when one lower layer is provided, this lower layer is formed by using the thermosetting coating material. When two or more lower layers are provided, at least one layer thereof is formed by using the thermosetting coating material.

The lower layer-thermosetting coating material is a thermosetting coating material having the curing temperature $T_U$ that satisfies the following formula (1):

$$T_U \leq T_T - 30 \quad (1)$$

(in the formula (1), $T_U$ represents the curing temperature [° C.] of the lower layer-thermosetting coating material, and $T_T$ represents the curing temperature [° C.] of the uppermost layer-thermosetting coating material).

When a thermosetting coating material having a curing temperature that satisfies the formula (1) is used as the lower layer-thermosetting coating material, the difference between the heating temperature $T_L$ and the heating temperature $T_H$ can be sufficiently widened. As a result, the curing of the lower layer and the curing of the uppermost layer are allowed to proceed independently from each other. In addition, from such viewpoints, the curing temperatures $T_U$ and $T_T$ preferably satisfy the following formula (1a):

$$T_U \leq T_T - 40 \quad (1a)$$

(in the formula (1a), $T_U$ and $T_T$ are the same as $T_U$ and $T_T$ in the formula (1)).

As the lower layer-thermosetting coating material, a thermosetting coating material used for ordinary baking finish can be used, as long as the thermosetting coating material having a curing temperature that satisfies the above formula (1), and preferably the above formula (1a). Examples of the thermosetting coating material include coating materials containing a thermosetting resin capable of being formed into a coating film, and a curing agent (for example, a compound or a resin having, in one molecule, two or more functional groups capable of reacting with functional groups of the thermosetting resin), for example, an intermediate coating material, a base coating material, and the like described in Japanese Unexamined Patent Application Publication No. 2004-275966.

Examples of the thermosetting resin which is contained in the lower layer-thermosetting coating material, and which is capable of being formed into a coating film, include acrylic resins, polyester resins, alkyd resins, epoxy resins, and urethane resins; however, the thermosetting resin is not limited thereto. Examples of the curing agent which is contained in the lower layer-thermosetting coating material include amine compounds, amino resins, isocyanate compounds, and isocyanate resins; however, the curing agent is not limited thereto. These resins and curing agents may be used alone or in combination of two or more kinds.

In the second coating method, of the lower layer-thermosetting coating materials, preferable is a coating material that forms substantially no volatile product at the time of the high-temperature heat treatment in view-of capability of reducing the shrinkage of the coating film after the uppermost layer is cured and thus the fluidity thereof significantly decreases when the uppermost layer is cured. Such a coating material preferably has a weight loss percentage of 0.5% by mass or less, more preferably 0.3% by mass or less, and particularly preferably 0.1% by mass or less, at the curing temperature $T_T$ of the uppermost layer-thermosetting coating material to be used. The use of such a thermosetting coating material having a low weight loss percentage as the lower layer-thermosetting coating material leads to the tendency to minimize the shrinkage of the coating film after the uppermost layer is cured by the heat treatment and thus the fluidity thereof significantly decreases. In addition, from such viewpoints, a coating material that forms no volatile product (having a weight loss percentage of 0% by mass) at the time of the high-temperature heat treatment is most preferable.

An example of the thermosetting coating material that forms substantially no volatile product at the time of the high-temperature heat treatment includes a coating material which is cured by an addition reaction, through a heat treatment, between a curing agent and a thermosetting resin capable of being formed into a coating film. Specific examples of the thermosetting coating material include a combination of a hydroxy group-containing acrylic resin with an isocyanate compound and/or an isocyanate resin, and a combination of an epoxy group-containing acrylic resin with a polyvalent carboxylic acid compound and/or a carboxyl group-containing resin.

Moreover, as the lower layer-thermosetting coating material, a coating material having a relative loss elastic modulus of 1 $s^{-2}$ or less (more preferably 0.9 $s^{-2}$ or less, and particularly preferably 0.8 $s^{-2}$ or less) when the employed uppermost layer-coating material starts to gel tends to be preferable. The relative loss elastic modulus of the lower layer-thermosetting coating material when the uppermost layer-coating material starts to gel can be made 1 $s^{-2}$ or less by, for example, adjusting the compositions and blend ratio of the thermosetting resin and the curing agent, or by blending an additive therewith, and thereby reducing, for example, the glass transition temperature, the cross-link density, or the like.

In the second coating method, when two or more lower layers are provided, at least one layer among these is formed by using the lower layer-thermosetting coating material, and the other layer(s) may be formed by using a noncurable coating material that undergoes no curing reaction by a heat treatment.

The noncurable coating material for forming the lower layer(s) can be any noncurable coating material, as long as the noncurable coating material undergoes substantially no curing reaction by a heat treatment. The noncurable coating material preferably has a weight loss percentage of 0.5% by mass or less, more preferably 0.3% by mass or less, and particularly preferably 0.1% by mass or less, at the curing temperature $T_T$ of the uppermost layer-thermosetting coating material. The use of such a noncurable coating material having a low weight loss percentage leads to the tendency to reduce the shrinkage of the coating film after the uppermost layer is cured by the heat treatment and thus the fluidity thereof significantly decreases. Furthermore, from such viewpoints, a coating material containing a resin capable of being formed into a coating film, but not containing a curing agent, is most preferable.

The resin which is contained in the noncurable coating material, and which is capable of being formed into a coating film, can be any resin, as long as the resin alone undergoes no curing reaction by the heat treatment. Examples thereof include resin components obtained by excluding a curing agent from an intermediate coating material, a base coating material, and the like described in, for example, Japanese Unexamined Patent Application Publication No. 2004-275966. Specific examples of the resin include acrylic resins, polyester resins, alkyd resins, epoxy resins, and urethane resins; however, the resin is not limited thereto. Further, two or more kinds of these resins, which undergo no curing reaction by the heat treatment, may be selected for use in combination.

In the second coating method, a thermosetting coating material having the curing temperature $T_T$ of 40° C. to 200° C. both inclusive, and preferably 60° C. to 160° C. both inclusive is used as the uppermost layer-coating material. Moreover, the uppermost layer-thermosetting coating material forms no volatile product in the curing reaction by the heat treatment. Note that, in the second coating method, the coating material that forms no volatile product can be any coating material, as long as the coating material forms substantially no volatile product. Such a coating material preferably has a weight loss percentage of 0.5% by mass or less, more preferably 0.3% by mass or less, and particularly preferably 0.10 by mass or less, at the curing temperature $T_T$. The use of such a thermosetting coating material having a low weight loss percentage as the uppermost layer-coating material leads to the tendency to minimize the shrinkage of the coating film after the uppermost layer is cured by the heat treatment and thus the fluidity thereof significantly decreases.

An example of the uppermost layer-thermosetting coating material includes a coating material which is cured by an addition reaction between a thermosetting resin capable of being formed into a coating film, and a curing agent (for example, a compound or a resin having, in one molecule, two or more functional groups capable of an addition reaction with functional groups of the thermosetting resin). A thermosetting coating material used as an uppermost layer-coating material for ordinary baking finish (for example, clear coating materials described in Japanese Unexamined Patent Application Publication No. 2004-275966) can be employed.

Examples of the thermosetting resin which is contained in the uppermost layer-thermosetting coating material, and which is capable of being formed into a coating film, include acrylic resins, polyester resins, alkyd resins, epoxy resins, and urethane resins; however, the thermosetting resin is not limited thereto. Examples of the curing agent contained in the uppermost layer-thermosetting coating material include amine compounds, amino resins, isocyanate compounds, and isocyanate resins; however, the curing agent is not limited thereto. Nonetheless, it is necessary to select an appropriate combination of the thermosetting resin with the curing agent so that no volatile product would be formed at the time of the curing reaction. These resins and curing agents may be used alone or in combination of two or more kinds.

Examples of a preferable combination of the thermosetting resin with the curing agent include a combination of a hydroxy group-containing acrylic resin with an isocyanate compound and/or an isocyanate resin, and a combination of an epoxy group-containing acrylic resin with a polyvalent carboxylic acid compound and/or a carboxyl group-containing resin.

In the second coating method of the present invention, first, the lower layer-coating material is applied on the substrate, and then a solvent is evaporated by drying or the like when needed. Thus, an uncured lower layer is formed. At this time, when one lower layer is provided, this lower layer is formed by using the lower layer-thermosetting coating material. When two or more lower layers are provided, at least one layer thereof is formed by using the lower layer-thermosetting coating material, and the other layer(s) may be formed by using the lower layer-noncurable coating material. However, in view of capability of improving the strength of the multi-layer coating film, all the layers are preferably formed by using the lower layer-thermosetting coating material.

Next, the uppermost layer-coating material is applied on the uncured lower layer, and then a solvent is evaporated by drying or the like when needed. Thus, an uncured uppermost layer is formed.

Then, an uncured multilayer coating film formed by applying the lower layer-coating material and the uppermost layer-coating material using a wet-on-wet technique as described above is first subjected to the heat treatment at the temperature $T_L$ to thus cure the lower layer-thermosetting coating material, forming a multilayer coating film including the uncured uppermost layer. Next, this multilayer coating film including the uncured uppermost layer is subjected to the heat treatment at the temperature $T_H$ to thus cure the uppermost layer-curable coating material.

In the second coating method, the heating temperatures $T_L$ and $T_H$ are set to satisfy the following formula (2):

$$T_U - 20 \leq T_L \leq T_T - 30 \quad (2),$$

and the following formula (3):

$$T_T - 20 \leq T_H \leq T_T + 40 \quad (3)$$

(in the formula (2) and the formula (3), $T_L$ represents a temperature [° C.] for the low temperature heating, $T_H$ represents a temperature [° C.] for the high temperature heating, and $T_U$ and $T_T$ are the same as $T_U$ and $T_T$ in the formula (1)).

By setting the heating temperatures $T_L$ and $T_H$ so as to satisfy the above formulas, the lower layer can be cured first without curing the uppermost layer, and then the uppermost layer can be cured. From such viewpoints, the heating temperature $T_L$ preferably satisfies the following formula (2a):

$$T_U \leq T_L \leq T_T - 30 \quad (2a),$$

and more preferably satisfies the following formula (2b):

$$T_U + 10 \leq T_L \leq T_T - 40 \quad (2b).$$

Meanwhile, the heating temperature $T_H$ preferably satisfies the following formula (3a):

$$T_T \leq T_H \leq T_T + 20 \quad (3a),$$

and more preferably satisfies the following formula (3b):

$$T_T = T_H \quad (3b).$$

In the formulas (2a), (2b), (3a) and (3b), $T_L$, $T_H$, $T_U$ and $T_T$ are the same as $T_L$, $T_H$, $T_U$ and $T_T$ in the formulas (2) and (3).

The duration for the low temperature heating is preferably 10% to 100% both inclusive, and more preferably 20% to 80% both inclusive, of the curing time of the lower layer-thermosetting coating material. Specifically, when the curing time of the lower layer-thermosetting coating material is 30 minutes, the duration for the low temperature heating is preferably 3 minutes to 30 minutes both inclusive, and more preferably 6 minutes to 24 minutes both inclusive. If the duration for the low temperature heating is less than the lower limit, the lower layer tends to be cured insufficiently. On the other hand, if the duration exceeds the upper limit, the overall heating duration tends to increase, thereby reducing the productivity.

Meanwhile, the duration for the high temperature heating is preferably 50% to 150% both inclusive, and more preferably 60% to 100% both inclusive, of the curing time of the uppermost layer-thermosetting coating material. Specifically, when the curing time of the uppermost layer-thermosetting coating material is 30 minutes, the duration for the high temperature heating is preferably 15 minutes to 45 minutes both inclusive, and more preferably 18 minutes to 30 minutes both inclusive. If the duration for the high temperature heating is less than the lower limit, the uppermost layer tends to be cured insufficiently. On the other hand, if the duration exceeds the upper limit, the uppermost layer tends to be cured excessively and is thus likely to be cracked or yellowed.

In the second coating method, the concentration of a volatile component in the multilayer coating film including the uncured uppermost layer is preferably reduced to 4% by mass or less, more preferably 3% by mass or less, and particularly preferably 2% by mass or less, before the high-temperature heat treatment is performed. This leads to the tendency to minimize the shrinkage of the coating film after the uppermost layer is cured by the high-temperature heat treatment and thus the fluidity thereof significantly decreases. An example of a preferable method of reducing the concentration of a volatile component in the multilayer coating film including the uncured uppermost layer before the high-temperature heat treatment is performed includes a method in which a heat treatment is performed at the temperature $T_L$.

<Third Coating Method>

A third coating method of the present invention is a coating method for forming a multilayer coating film including at least one lower layer formed on a substrate and an uppermost layer formed on the lower layer, and the coating method comprises the steps of:

preparing a curable coating material as an uppermost layer-coating material for forming the uppermost layer, wherein the curable coating material forms a cross-linked structure by a chemical reaction, and preparing a coating material as at least one lower layer-coating material for forming the lower layer, wherein the coating material has a relative loss elastic modulus of 1 s$^{-2}$ or less when the uppermost layer-coating material starts to gel;

forming an uncured multilayer coating film by applying the lower layer-coating material and the uppermost layer-coating material on the substrate using a wet-on-wet technique; and curing at least the uppermost layer-coating material by subjecting the uncured multilayer coating film to a curing treatment.

In the third coating method, one or more kinds of lower layer-coating materials are applied on the substrate, and then a solvent and the like are evaporated by drying or the like when needed. Thus, an uncured lower layer is formed. Next, the uppermost layer-coating material is applied on the uncured lower layer, and then a solvent and the like are evaporated by drying or the like when needed. Thus, an uncured uppermost layer is formed. Thereafter, the uncured multilayer coating film thus obtained is subjected to a curing treatment, and at least the uppermost layer-coating material is cured.

The substrate used in the third coating method is not particularly limited. Examples of the substrate include metals (such as iron, copper, aluminum, tin, and zinc, as well as alloys of these metals), steel plates, plastics, foamed materials, paper, wood, cloth, and glass. Of those, the present invention is preferably adopted for steel plates for automobile, for which a high appearance quality is required. Surfaces of these substrates may be subjected to a treatment such as electrodeposition-coating in advance.

In the third coating method, a curable coating material is used as the uppermost layer-coating material, wherein the curable coating material forms a cross-linked structure by a chemical reaction. As such an uppermost layer-curable coating material, a thermosetting coating material is preferable. The thermosetting coating material can be, for example, any thermosetting coating material, as long as the thermosetting coating material contains a thermosetting resin capable of being formed into a coating film, and a curing agent (for example, a compound or a resin having, in one molecule, two or more functional groups capable of reacting with functional groups of the thermosetting resin). Examples thereof include thermosetting coating materials used as an uppermost layer-coating material for ordinary baking finish (for example, clear coating materials described in Japanese Unexamined Patent Application Publication No. 2004-275966).

Examples of the thermosetting resin which is contained in the uppermost layer-thermosetting coating material, and which is capable of being formed into a coating film, include acrylic resins, polyester resins, alkyd resins, epoxy resins, and urethane resins; however, the thermosetting resin is not limited thereto. Examples of the curing agent which is contained in the uppermost layer-thermosetting coating material include amine compounds, amino resins, isocyanate compounds, and isocyanate resins; however, the curing agent is not limited thereto. These resins and curing agents may be used alone or in combination of two or more kinds.

A curing temperature $T_T$ of the uppermost layer-coating material is not particularly limited; however, the curing temperature $T_T$ is normally 40° C. to 200° C. both inclusive, and preferably 60° C. to 160° C. both inclusive. In addition, the uppermost layer-coating material is preferably a curable coating material that forms substantially no volatile product in the curing reaction. Such a coating material preferably has a weight loss percentage of 0.5% by mass or less, more preferably 0.3% by mass or less, and particularly preferably 0.1% by mass or less, at the curing temperature $T_T$ thereof. The use of such a coating material having a low weight loss percentage as the uppermost layer-coating material leads to the tendency to minimize the shrinkage of the coating film after the uppermost layer is cured by the curing treatment and thus the fluidity thereof significantly decreases. From such viewpoints, a curable coating material that forms no volatile product (having a weight loss percentage of 0% by mass) is most preferable.

In the third coating method, examples of a preferable combination of the thermosetting resin with the curing agent when the thermosetting coating material is used as the uppermost layer-coating material include a combination of a hydroxy group-containing acrylic resin with an isocyanate compound and/or an isocyanate resin, and a combination of an epoxy group-containing acrylic resin with a polyvalent carboxylic acid compound and/or a carboxyl group-containing resin. The use of the thermosetting coating material formed from such a combination leads to the tendency that a volatile product are less likely to be formed in a curing treatment by heating.

In the third coating method, at least one lower layer is formed on the substrate. At least one lower layer is formed by using a coating material which has a relative loss elastic modulus of 1 $s^{-2}$ or less (more preferably 0.9 $s^{-2}$ or less, and particularly preferably 0.8 $s^{-2}$ or less) when the uppermost layer-coating material starts to gel (hereinafter, the coating material is referred to as a "coating material having a low loss elastic modulus"). Specifically, when one lower layer is provided, this lower layer is formed by using the coating material having a low loss elastic modulus. When two or more lower layers are provided, at least one layer thereof is formed by using the coating material having a low loss elastic modulus. When two or more lower layers are provided, a lower layer closer to the uppermost layer is preferably formed by using the coating material having a low loss elastic modulus, and all the lower layers are more preferably formed by using the coating material having a low loss elastic modulus, in view of capability of further reducing the surface unevenness of the multilayer coating film. The coating material having a low loss elastic modulus may be a noncurable coating material that undergoes no curing reaction and forms no cross-linked structure, or a curable coating material that forms a cross-linked structure by a chemical reaction, as long as the coating material has a relative loss elastic modulus within the aforementioned range when the uppermost layer-coating material starts to gel.

The noncurable coating material having a low loss elastic modulus used in the third coating method can be any noncurable coating material, as long as the noncurable coating material undergoes substantially no curing reaction in curing the uppermost layer. The noncurable coating material preferably has a weight loss percentage of 0.5% by mass or less, more preferably 0.3% by mass or less, and particularly preferably 0.1% by mass or less, at the curing temperature $T_T$ of the uppermost layer-coating material to be used. The use of such a noncurable coating material having a low weight loss percentage leads to the tendency to reduce the shrinkage of the multilayer coating film after the uppermost layer is cured by the curing treatment and thus the fluidity thereof significantly decreases. Furthermore, from such viewpoints, a coating material containing a resin capable of being formed into a coating film, but not containing a curing agent, is most preferable.

As the resin which is contained in the noncurable coating material, and which is capable of being formed into a coating film, preferable is a resin which alone undergoes no curing reaction. Examples thereof include resin components obtained by excluding a curing agent from an intermediate coating material, a base coating material, and the like described in, for example, Japanese Unexamined Patent Application Publication No. 2004-275966. Specific examples of the resin include acrylic resins, polyester resins, alkyd resins, epoxy resins, and urethane resins; however, the resin is not limited thereto. Further, two or more kinds of these resins which undergo no curing reaction may be selected for use in combination.

By contrast, as the curable coating material having a low loss elastic modulus used in the third coating method, a thermosetting coating material used for ordinary baking finish can be suitably used, as long as the thermosetting coating material has a relative loss elastic modulus within the aforementioned range when the uppermost layer-coating material starts to gel. An example of the thermosetting coating material includes a thermosetting coating material which contains a thermosetting resin capable of being formed into a coating film, and a curing agent (for example, a compound or a resin having, in one molecule, two or more functional groups capable of reacting with functional groups of the thermosetting resin), and which has a relative loss elastic modulus of 1 $s^{-2}$ or less (more preferably 0.9 $s^{-2}$ or less, and particularly preferably 0.8 $s^{-2}$ or less) when the uppermost layer-coating material starts to gel.

Moreover, in view of capability of reducing the shrinkage of the coating film after the uppermost layer is cured by the curing treatment and thus the fluidity thereof significantly decreases, a curable coating material having a low loss elastic modulus that forms substantially no volatile product in curing the uppermost layer is preferably used. Such a coating material preferably has a weight loss percentage of 0.5% by mass or less, more preferably 0.3% by mass or less, and particularly preferably 0.1% by mass or less, at the curing temperature $T_T$ of the uppermost layer-coating material to be used. The use of such a curable coating material having a low loss elastic modulus having a low weight loss percentage as the lower layer-coating material leads to the tendency to minimize the shrinkage of the coating film after the uppermost layer is cured by the curing treatment and thus the fluidity thereof significantly decreases. In addition, from such viewpoints, a curable coating material having a low loss elastic modulus that forms no volatile product (having a weight loss percentage of 0% by mass) in curing the uppermost layer is most preferable.

Examples of the thermosetting resin which is contained in such a curable coating material having a low loss elastic modulus, and which is capable of being formed into a coating film, include acrylic resins, polyester resins, alkyd resins, epoxy resins, and urethane resins. Meanwhile, examples of the curing agent contained in the curable coating material having a low loss elastic modulus include isocyanate compounds, isocyanate resins, amine compounds, and amino resins. These resins and curing agents may be used alone or in combination of two or more kinds. In the third coating method, the relative loss elastic modulus of the curable coating material having a low loss elastic modulus when the uppermost layer-coating material starts to gel can be made 1 $s^{-2}$ or less by, for example, adjusting the compositions and blend ratio of the thermosetting resin and the curing agent, or by blending an additive therewith, and thereby reducing, for example, the glass transition temperature, the cross-link density, or the like.

In the third coating method, of the noncurable coating material having a low loss elastic modulus and the curable coating material having a low loss elastic modulus, the noncurable coating material having a low loss elastic modulus is preferably used in view of capability of minimizing the shrinkage of the multilayer coating film. On the other hand, in view of capability of ensuring the strength of the multilayer coating film, the curable coating material having a low loss elastic modulus is preferably used. Thus, these can be used appropriately on a case-by-case basis according to usage or the like.

Moreover, in the third coating method, when two or more lower layers are provided, as long as at least one layer thereof is a layer formed by using the coating material having a low loss elastic modulus, the other layer(s) may be formed by using a coating material that has a relative loss elastic modulus exceeding 1 $s^{-2}$ when the uppermost layer-coating material starts to gel (hereinafter, the coating material is referred to as a "coating material having a high loss elastic modulus"). As such a coating material having a high loss elastic modulus, a thermosetting coating material used for ordinary baking finish can be used, as long as the relative loss elastic modulus exceeds 1 $s^{-2}$ when the uppermost layer-coating material starts to gel. An example of the thermosetting coating material includes a thermosetting coating material which contains a thermosetting resin capable of being formed into a coating film, and a curing agent (for example, a compound or a resin having, in one molecule, two or more functional groups capable of reacting with functional groups of the thermosetting resin), and which has a relative loss elastic modulus exceeding 1 $s^{-2}$ when the uppermost layer-coating material starts to gel.

Moreover, in view of capability of reducing the shrinkage of the coating film after the uppermost layer is cured by the curing treatment and thus the fluidity thereof significantly decreases, a coating material having a high loss elastic modulus that forms substantially no volatile product in curing the uppermost layer is preferably used. Such a coating material preferably has a weight loss percentage of 0.5% by mass or less, more preferably 0.3% by mass or less, and particularly preferably 0.1% by mass or less, at the curing temperature $T_T$ of the uppermost layer-coating material to be used. The use of such a coating material having a high loss elastic modulus having a low weight loss percentage as the lower layer-coating material leads to the tendency to minimize the shrinkage of the coating film after the uppermost layer is cured by the curing treatment and thus the fluidity thereof significantly decreases. In addition, from such viewpoints, a coating material having a high loss elastic modulus that forms no volatile product (having a weight loss percentage of 0% by mass) in curing the uppermost layer is most preferable.

Examples of the thermosetting resin which is contained in such a coating material having a high loss elastic modulus, and which is capable of being formed into a coating film, include acrylic resins, polyester resins, alkyd resins, epoxy resins, and urethane resins. Meanwhile, examples of the curing agent contained in the coating material having a high loss elastic modulus include isocyanate compounds, isocyanate resins, amine compounds, and amino resins. These resins and curing agents may be used alone or in combination of two or more kinds. In the third coating method, the relative loss elastic modulus of the curable coating material having a low loss elastic modulus when the uppermost layer-coating material starts to gel can be made to exceed 1 $s^{-2}$ by adjusting the compositions and blend ratio of the thermosetting resin and the curing agent, and thereby increasing, for example, the glass transition temperature, the cross-link density, or the like.

Moreover, in the third coating method, when thermosetting coating materials are used for both the uppermost layer-coating material and the lower layer-coating material (the coating material having a low loss elastic modulus and/or the coating material having a high loss elastic modulus), the uppermost layer-coating material and the lower layer-coating material having the same curing temperature can be used; alternatively, the uppermost layer-coating material and the lower layer-coating material having different curing temperatures can be used. The former case is suited to a case where a curing treatment (preferably, heat treatment) to be described later is performed in one stage, whereas the latter case is suited to a case where a curing treatment (preferably, heat treatment) is performed in two or more stages.

In the latter case, the curing temperature $T_T$ of the uppermost layer-coating material and the curing temperature $T_U$ of the lower layer-coating material preferably satisfy a condition expressed by the following formula (1):

$$T_U \leq T_T-30 \tag{1}$$

When the lower layer-coating material satisfying the condition expressed by the formula (1) is used, a two-stage heat treatment including a low-temperature heat treatment and a high-temperature heat treatment can be performed; besides, the difference between the heating temperatures can be sufficiently widened. As a result, the uppermost layer and the lower layer can be cured independently from each other. In addition, from such viewpoints, the curing temperatures $T_U$ and $T_T$ more preferably satisfy a condition expressed by the following formula (1a):

$$T_U \leq T_T-40 \tag{1a}$$

(in the formula (1a), $T_U$ and $T_T$ are the same as $T_U$ and $T_T$ in the formula (1)).

When two or more lower layers are provided, the curing temperature $T_U$ of any lower layer-coating material particularly preferably satisfies the condition expressed by the formula (1) or (1a).

In the third coating method of the present invention, first, the lower layer-coating material is applied on the substrate, and then a solvent is evaporated by drying or the like when needed. Thus, an uncured lower layer is formed. At this time, when one lower layer is provided, this lower layer is formed by using the coating material having a low loss elastic modulus. When two or more lower layers are provided, at least one layer thereof is formed by using the coating material having a low loss elastic modulus, and the other layer(s) may be formed by using the coating material having a high loss elastic modulus. However, in view of capability of reducing the surface unevenness of the multilayer coating film formed by the shrinkage of the coating film, all the lower layers are preferably formed by using the coating material having a low loss elastic modulus.

Next, the uppermost layer-coating material is applied on the uncured lower layer, and then a solvent is evaporated by drying or the like when needed. Thus, an uncured uppermost layer is formed.

Then, an uncured multilayer coating film formed by applying the lower layer-coating material and the uppermost layer-coating material using a wet-on-wet technique is subjected to the curing treatment (preferably, heat treatment) to thus cure at least the uppermost layer-coating material.

In the third coating method, when a heat treatment is performed as the curing treatment, the heat treatment may be performed in one stage, or in two or more stages. Nevertheless, the heat treatment is preferably performed at or above a temperature at which at least the uppermost layer is cured (hereinafter, this heat treatment is referred to as a "high-temperature heat treatment", and the heating temperature in this event is defined as a "temperature $T_H$ for the high temperature heating"). For example, this heat treatment is preferably performed at the temperature $T_H$ which is at or above [the curing temperature of the uppermost layer-coating material $T_T-20°$ C.]. In either case of the heat treatment in one stage or in two or more stages, the temperature $T_H$ for the high temperature heating more preferably satisfies a condition expressed by the following formula (3):

$$T_T-20 \leq T_H \leq T_T+40 \tag{3}$$

particularly preferably satisfies a condition expressed by the following formula (3a):

$$T_T \leq T_H \leq T_T+20 \tag{3a}$$

and most preferably satisfies a condition expressed by the following formula (3b):

$$T_T = T_H \tag{3b}$$

Note that, in the formulas (3), (3a) and (3b), $T_T$ is the same as $T_T$ in the formula (1). If the temperature for the high temperature heating is less than the lower limit, the uppermost layer tends to be cured insufficiently. On the other hand, if the temperature exceeds the upper limit, the uppermost layer tends to be cured excessively and is thus likely to be cracked or yellowed.

The duration for the high temperature heating is preferably 50% to 150% both inclusive, and more preferably 60% to 100% both inclusive, of the curing time of the uppermost layer-coating material. Specifically, when the curing time of the uppermost layer-coating material is 30 minutes, the duration for the high temperature heating is preferably 15 minutes to 45 minutes both inclusive, and more preferably 18 minutes to 30 minutes both inclusive. If the duration for the high temperature heating is less than the lower limit, the uppermost layer tends to be cured insufficiently. On the other hand, if the duration exceeds the upper limit, the uppermost layer tends to be cured excessively and is thus likely to be cracked or yellowed.

Moreover, in the third coating method, the heat treatment may be performed in two or more stages in such a manner that, before the high-temperature heat treatment, a heat treatment is performed at a temperature lower (hereinafter, this heat treatment is referred to as a "low-temperature heat treatment", and this temperature is referred to as a "temperature $T_L$ for the low temperature heating") than the temperature $T_H$ for the high temperature heating. This low-temperature heat treatment leads to the tendency to reduce the concentration of a volatile component in the multilayer coating film before the uppermost layer is cured. Furthermore, from the viewpoint that the curing of the uppermost layer can be prevented during the low-temperature heat treatment, the temperature $T_L$ for the low temperature heating is preferably a temperature below [the curing temperature of the uppermost layer-coating material $T_T-20°$ C.], more preferably a temperature below [$T_T-30°$ C.], and particularly preferably a temperature below [$T_T-40°$ C.].

Furthermore, when the thermosetting coating material is used as the lower layer-coating material, in view of capability of sufficiently curing the lower layer before the uppermost layer is cured, the temperature $T_L$ for the low temperature heating more preferably satisfies a condition expressed by the following formula (2):

$$T_U-20 \leq T_L \leq T_T-30 \tag{2}$$

particularly preferably satisfies a condition expressed by the following formula (2a):

$$T_U \leq T_L \leq T_T-30 \tag{2a}$$

and most preferably satisfies a condition expressed by the following formula (2b):

$$T_U+10 \leq T_L \leq T_T-40 \tag{2b}$$

Note that, in the formulas (2), (2a) and (2b), $T_U$ and $T_T$ are the same as $T_U$ and $T_T$ in the formula (1).

When the noncurable coating material is used as the lower layer-coating material, the duration for the low temperature heating is preferably 10% inclusive to 50% exclusive, and more preferably 20% to 40% both inclusive, of the curing time of the uppermost layer-coating material, in view of capability of reducing the concentration of a volatile component in the multilayer coating film without substantially curing the uppermost layer. Meanwhile, when the thermosetting coating material is used as the lower layer-coating material, the duration is preferably 10% to 100% both inclusive, and more preferably 20% to 80% both inclusive, of the curing time of the lower layer-coating material. If the duration for the low temperature heating is less than the lower limit, the lower layer tends to be cured insufficiently. On the other hand, if the duration exceeds the upper limit, the overall heating duration tends to be increased, thereby reducing the productivity.

Furthermore, in the first to third coating methods of the present invention, in order to stabilize the uncured multilayer coating film applied using the wet-on-wet technique, the uncured coating film is preferably allowed to stand (subjected to flash) at room temperature before the heat treatment (or, before the low-temperature heat treatment, if performed). The flash duration is generally set to 1 to 20 minutes.

In addition, in the first to third coating methods of the present invention, in order to obtain a coated article having a higher quality appearance, a surface layer is preferably formed by further applying one or more kinds of coating materials on the uppermost layer of a coated article obtained by the above-described coating method, and then performing a curing treatment. As the coating materials, those listed as the examples of the uppermost layer-coating material can be used.

In the first to third coating methods of the present invention, the film thickness of each lower layer can be appropriately set in accordance with a desired usage. For example, the film thickness after the curing treatment such as heat treatment is preferably 5 to 50 μm, and more preferably 10 to 40 μm. If the film thickness of any lower layer is less than the lower limit, it tends to be difficult to obtain a uniform coating film for the lower layer. On the other hand, if the film thickness exceeds the upper limit, there are tendencies that the lower layer absorbs a large amount of solvent and the like contained in the coating film for the uppermost layer, and that the evaporation of the solvent contained in the lower layer itself is prevented and thereby the appearance quality of the multilayer coating film is deteriorated.

Moreover, the film thickness of the uppermost layer can be appropriately set in accordance with a desired usage. For example, the film thickness after the curing treatment such as heat treatment is preferably 15 to 60 μm, and more preferably 20 to 50 μm. If the film thickness of the uppermost layer is less than the lower limit, the fluidity is insufficient and thereby the appearance quality of the multilayer coating film tends to be deteriorated. On the other hand, if the film thickness exceeds the upper limit, the fluidity is excessively high, and thereby defect such as sagging tends to occur in a case where the application is performed in a vertical direction.

In the first to third coating methods of the present invention, the forms of the noncurable coating material, the lower layer-thermosetting coating material, the curable coating material having a low loss elastic modulus and the coating material having a high loss elastic modulus may be each any of solvent-based form, water-based form and powder form. However, the water-based form or the powder form is preferable in view of capability of reducing emission amount of a volatile organic compound. Moreover, the form of the uppermost layer-coating material may be any of solvent-based form, water-based form and powder form.

In addition, the coating material used in the first to third coating methods may contain a conventionally known coloring pigment, effect pigment (a metal pigment and/or a luster pigment), or the like within a conventionally known range when needed. Furthermore, in order to adjust various properties, various additives such as a rheology control agent, a surface additive (surface conditioner), a thicker, a light stabilizer (antioxidant), an ultraviolet absorber (ultraviolet inhibitor), and a defoamer, may be blended within a conventionally known range.

In the first to third coating methods of the present invention, conventionally known methods such as air spray coating, air electrostatic spray coating, and rotary atomizing electrostatic coating can be employed as the coating method of the coating materials in the case of using each of coating materials of the thermosetting coating material and the noncurable coating material.

<Coated Article>

A coated article of the present invention is produced according to any coating method of the first to third coating methods of the present invention. The coated article comprises a multilayer coating film having less surface unevenness than multilayer coating films produced using a conventional wet-on-wet technique, and is excellent in appearance quality. Such coated articles are useful especially as bodies or components of automobiles such as passenger cars, trucks, buses and motorcycles.

EXAMPLES

Hereinafter, the present invention will be described more specifically on the basis of Examples and Comparative Examples. However, the present invention is not limited to the following Examples. Note that the relative loss elastic modulus of each lower layer-coating material when an uppermost layer-coating material started to gel and the weight loss percentage of each coating material by a heat treatment were determined by the following methods.

<Relative Loss Elastic Modulus of Each Lower Layer-Coating Material when Uppermost Layer-Coating Material Started to Gel>

First, an uppermost layer-coating material was applied to a stainless steel plate of 40 mm×50 mm (thickness: 0.5 mm) so that the film thickness of the coating material after a heat treatment would be 35±5 μm. Specifically, the stainless steel plate was put on a horizontal table, and an adhesive tape having a thickness of 70 μm was pasted on a region of the stainless steel plate, the region being located approximately 5 mm inward of an edge of each of two opposing sides of the stainless steel plate. By sliding a knife with a straight edge onto the tape, the uppermost layer-coating material was applied into a gap between the stainless steel plate and the knife edge.

The relative storage elastic modulus ($E_r'$) of the coating film made from the uppermost layer-coating material was measured, 7±1 minutes after the coating film was formed in this manner. The measurement was made using a rigid-body pendulum type physical properties testing instrument (model: RPT-5000 manufactured by A&D Company, Limited) provided with an annular pendulum having a diameter of 74 mm to which a knife-edge having an edge angle of 40° was attached. The temperature program at the time of the measurement was set so that the temperature was increased from room temperature (25° C.) to the curing temperature of the uppermost layer-coating material at a rate of temperature rise of 20±4° C./minute, and then the curing temperature was maintained.

The measured values of the relative storage elastic modulus ($E_r'$) were plotted against time. The part of the measured values acquired over 15 minutes from the aforementioned inflection point was fitted to the following formula (5):

$$E_r' = A[1 - \exp\{k(t - t_d)\}] \tag{5}$$

(in Formula (5), A and k are constant, and t represents time) to determine, according to the nonlinear least-squares method, a time-axis intercept, i.e., time $t_d$ from when the measurement was started to when the uppermost layer-coating material started to gel.

Next, a coating film of a target lower-layer coating material was formed in the same manner as in the case of the uppermost layer-coating material, and then the relative loss elastic modulus ($E_r''$) of the lower layer-coating material was measured under the same condition as that in the case of the uppermost layer-coating material. From this measured result, the relative loss elastic modulus ($E_r''$) at the time $t_d$ was determined, and this was defined as the "relative loss elastic modulus when the uppermost layer-coating material started to gel".

<Determination of Weight Loss Percentage>

A target coating material was applied on aluminum foil so the film thickness of the coating material after a heat treatment would be a target film thickness in the multilayer coating film. The obtained aluminum foil sample was dried at a temperature, which was lower than the curing temperature $T_T$ of the uppermost layer-coating material by 40° C. [$T_T$-40° C.], under the vacuum condition of $10^{-2}$ Torr or less for 90 minutes. Thereafter, the sample was heated at the curing temperature $T_T$ of the uppermost layer-coating material for 30 minutes by using a gas chromatograph/mass spectrometer (for example, 6890GC/5975MSD manufactured by Agilent Technologies, Inc.) equipped with a thermal desorption introduction system (for example, Thermal Desorption System manufactured by GERSTEL K.K.) to quantitatively determine the amount of a volatile product (Rc (unit: g)) and the amount of the residual solvent in the sample. Then, the weight loss percentage was calculated by the formula (4). The weight loss percentage is a percentage of the amount of the volatile product relative to the total amount of binder in the coating film.

$$\text{Weight loss percentage} = 100 \times Rc/W \times 100/(100-P) \quad (4)$$

In the formula (4), W is the mass (unit: g) of the coating film obtained in the vacuum drying step, and P is the mass (unit: g) of a pigment contained in 100 g of the coating film. Note that the value in the composition table of the coating material was employed as the mass of the pigment.

Synthesis Example 1

Synthesis of Acrylic Resin A

A mixture solution A was prepared by mixing 4.5 parts by mass of methacrylic acid, 26.0 parts by mass of ethyl acrylate, 64.5 parts by mass of hydroxy group-containing monomer (product name "PLACCEL FM-1" manufactured by Daicel Chemical Industries, Ltd.), 5.0 parts by mass of methylstyrene dinner (product name "MSD-100" manufactured by Mitsui Toatsu Chemicals, Inc.) and 13.0 parts by mass of azoisobutyronitrile.

Into a reaction vessel equipped with a stirrer, a thermostat and a reflux condenser, 82.0 parts by mass of xylene was poured, and then 20.0 parts by mass of the mixture solution A was added thereto and heated with stirring to increase the temperature. Thereafter, the remainder, 93.0 parts by mass, of the mixture solution A was added dropwise under reflux over a period of 3 hours. Next, a solution made from 1.0 part by mass of azoisobutyronitrile and 12.0 parts by mass of xylene was added dropwise over a period of 30 minutes, and reaction was allowed to proceed. The obtained reaction solution was refluxed for another hour with stirring. Thus, a resin solution A containing an acrylic resin A having a number average molecular weight of 2000 was obtained. The resin solution A was desolvated with an evaporator until the solid content thereof became 75% by mass, and thereby an acrylic resin varnish A was obtained.

Synthesis Example 2

Synthesis of Acrylic Resin B

A mixture solution B was prepared by mixing 5.0 parts by mass of acrylic acid, 17.0 parts by mass of 2-hydroxyethyl acrylate, 66.0 parts by mass of n-butyl methacrylate, 12.0 parts by mass of stearyl acrylate and 0.8 parts by mass of azobisisobutyronitrile.

Into a reaction vessel equipped with a stirrer, a thermostat and a reflux condenser, 82.0 parts by mass of isopropyl alcohol was poured, and the vessel was purged with nitrogen and heated to a temperature of 80° C. Next, the mixture solution B (100.8 parts by mass) was added dropwise over a period of 5 hours. Thereafter, stirring was continued for 1 hour, and thereby a resin solution B containing an acrylic resin B having a number average molecular weight of 15000 was obtained. The resin solution B was desolvated with an evaporator until the solid content thereof became 80% by mass. Then, 6.0 parts by mass of dimethylethanolamine and 36.0 parts by mass of ion-exchanged water were added thereto, and thus an acrylic resin varnish B having a solid content of 60% by mass was obtained.

Preparation Example 1

Preparation of Thermosetting and Water-Based Intermediate Coating Material A

Into a reaction vessel, 337 parts by mass of the acrylic resin varnish A prepared in Synthesis Example 1 and having a solid content of 75% by mass, 1000 parts by mass of titanium oxide (product name "CR-93" manufactured by ISHIHARA SANGYO KAISHA, LTD.) and 10 parts by mass of carbon black (product name "FW-200P" manufactured by Degussa GmbH) were put, and then 163 parts by mass of butyl acetate and 84 parts by mass of xylene were added thereto. Thereafter, glass beads (with a particle diameter of 1.6 mm) with a mass equivalent to the total mass of the put materials were added, and dispersed for 3 hours by using a bench-top SG mill. The particle size after the completion of the dispersion was 5 µm or smaller with a grind gauge. Thereafter, 84 parts by mass of xylene was added. After that, the glass beads were filtered off, and thereby a pigment paste was prepared. The acrylic resin varnish A and a melamine resin (product name "Cymel 254" manufactured by Cytec Industries Inc.) were added to this pigment paste in such a manner that the solid mass ratio of the acrylic resin to the melamine resin was to be 10:1.5, and so that the pigment concentration in an intermediate coating film was to be 50.0% by mass. The resultant mixture was diluted with ion-exchanged water. Thus, a thermosetting and water-based intermediate coating material A having a solid content of 50% by mass was, prepared. The curing temperature of this thermosetting and water-based intermediate coating material A was 140° C., and the weight loss percentage thereof at 140° C. was 1.6% by mass (the calculation was made assuming that P=50.0).

Preparation Example 2

Preparation of Thermosetting and Water-Based Intermediate Coating Material B

A thermosetting and water-based intermediate coating material B having a solid content of 50% by mass was prepared in the same manner as in Preparation Example 1, except that the acrylic resin varnish A and the melamine resin (product name "Cymel 254" manufactured by Cytec Industries Inc.) were used in such a manner that the solid mass ratio of the acrylic resin to the melamine resin was to be 10:3. The curing temperature of this thermosetting and water-based intermediate coating material B was 140° C., and the weight loss percentage thereof at 140° C. was 3.3% by mass (the calculation was made assuming that P=50.0).

Preparation Example 3

Preparation of Melamine-Curable and Water-Based Intermediate Coating Material a

Into a reaction vessel, 337 parts by mass of the acrylic resin varnish A prepared in Synthesis Example 1 and having a solid content of 75% by mass, 1000 parts by mass of titanium oxide (product name "CR-93" manufactured by ISHIHARA SANGYO KAISHA, LTD.) and 10 parts by mass of carbon black (product name "FW-200P" manufactured by Degussa GmbH) were put, and then 163 parts by mass of butyl acetate and 84 parts by mass of xylene were added thereto. Thereafter, glass beads (with a particle diameter of 1.6 mm) with a mass equivalent to the total mass of the put materials were added, and dispersed for 3 hours by using a bench-top SG mill. The particle size after the completion of the dispersion was 5 μm or smaller with a grind gauge. Thereafter, 84 parts by mass of xylene was added. After that, the glass beads were filtered off, and thereby a pigment paste was prepared. The acrylic resin varnish A and a melamine resin (product name "Cymel 254" manufactured by Cytec Industries Inc.) were added to this pigment paste in such a manner that the solid mass ratio of the acrylic resin to the melamine resin was to be 10:3, and so that the pigment concentration in an intermediate coating film was to be 50.0% by mass. The resultant mixture was diluted with ion-exchanged water. Thus, a melamine-curable and water-based intermediate coating material a having a solid content of 50% by mass was prepared. The curing temperature of this melamine-curable and water-based intermediate coating material a was 140° C.

Preparation Example 4

Preparation of Noncurable and Water-Based Base Coating Material A

To the acrylic resin varnish B prepared in Synthesis Example 2 and having a solid content of 60% by mass, 1-t-butoxy-2-propanol with a mass equivalent to the solid mass of the acrylic resin varnish B was added. Further, an aluminum paste for a water-based coating material was added thereto in such a manner that the pigment concentration in a base coating film was to be 17.7% by mass. The resultant mixture was diluted with ion-exchanged water. Thus, a noncurable and water-based base coating material A having a solid content of 20% by mass was prepared. The weight loss percentage of this noncurable and water-based base coating material A at 140° C. was 0% by mass.

Preparation Example 5

Preparation of Thermosetting (Melamine-Curable) and Water-Based Base Coating Material B To the acrylic resin varnish B prepared in Synthesis Example 2 and having a solid content of 60% by mass, a melamine resin (product name "Cymel 325" manufactured by Cytec Industries Inc.) was added in such a manner that the solid mass ratio of the acrylic resin to the melamine resin was to be 10:2. Further, an aluminum paste for a water-based coating material was added thereto in such a manner that the pigment concentration in a base coating film was to be 17.7% by mass. The resultant mixture was diluted with ion-exchanged water. Thus, a thermosetting (melamine-curable) and water-based base coating material B having a solid content of 20% by mass was prepared. The curing temperature of this thermosetting (melamine-curable) and water-based base coating material B was 140° C., and the weight loss percentage thereof at 140° C. was 1.6% by mass (the calculation was made assuming that P=17.7).

Preparation Example 6

Preparation of Thermosetting and Water-Based Base Coating Material C

A thermosetting and water-based base coating material C having a solid content of 20% by mass was prepared in the same manner as in Preparation Example 5, except that the acrylic resin varnish B and the melamine resin (product name "Cymel 325" manufactured by Cytec Industries Inc.) were used in such a manner that the solid mass ratio of the acrylic resin to the melamine resin was to be 10:1. The curing temperature of this thermosetting and water-based base coating material C was 140° C., and the weight loss percentage thereof at 140° C. was 0.8% by mass (the calculation was made assuming that P=17.7).

Preparation Example 7

Preparation of Thermosetting (Isocyanate-Curable) Clear Coating Material A

A polyol, additives and solvents were mixed together in proportions shown in Table 1. Thus, a base compound for a two-pack thermosetting (isocyanate-curable) clear coating material was prepared. Meanwhile, as a curing agent for the thermosetting (isocyanate-curable) clear coating material, an isocyanate curing agent shown in Table 1 was used. In each of Examples A1, A3 to A4 and Comparative Examples A1 to A3 as well as Examples B1 to B5 and Comparative Examples B1 and B2, a mixture obtained by mixing this base compound and this curing agent in proportions shown in Table 1 (solid content: 55% by mass) was used as a thermosetting (isocyanate-curable) clear coating material A. The curing temperature of this thermosetting clear coating material A was 140° C., and the weight loss percentage thereof at 140° C. was 0% by mass.

Preparation Example 8

Preparation of Thermosetting Clear Coating Material B

A polyol, additives and solvents were mixed together in proportions shown in Table 1. Thus, a base compound for a two-pack thermosetting clear coating material was prepared. Meanwhile, a mixture obtained by adding 4.3 parts by mass of 3,5-dimethyl pyrazole, serving as a blocking agent, to 100 parts by mass in terms of a solid of an isocyanate curing agent (product name "Desmodur N 3390 Ba/SN" manufactured by Bayer AG) was used as a curing agent for the thermosetting clear coating material. In Example A2, a mixture obtained by mixing this base compound and this curing agent in proportions shown in Table 1 was used as a thermosetting clear coating material B. The curing temperature of this thermosetting clear coating material B was 140° C., and the weight loss percentage thereof at 140° C. was 1.5% by mass.

based base coating material A, the thermosetting clear coating material A prepared in Preparation Example 7 was applied so the film thickness thereof after heat treatments was to be 35 μm. Thus, an uncured multilayer coating film in which the noncurable and water-based base coating material A and the thermosetting clear coating material A were applied using a wet-on-wet technique was obtained. This uncured multilayer coating film was allowed to stand (subjected to flash) at room temperature for 10 minutes, and then a heat treatment at 90° C. for 10 minutes and a heat treatment at 140° C. for 30 minutes were sequentially performed to thereby cure the thermosetting clear coating material A. During this period, the mass Wt (unit: g) of the multilayer coating film was measured at a predetermined timing, and the concentration V of a volatile component (unit: % by mass) in the multilayer coating film was calculated according to the formula (6).

$$V = (Wt - We)/Wt \times 100 \quad (6)$$

In the formula (6), We is the mass (unit: g) of the multilayer coating film after the completion of the heat treatments.

TABLE 1

|  |  |  | Product name | |
|---|---|---|---|---|
|  |  |  | Clear coating material A | Clear coating material B |
| Main compound | Polyol | Desmophen A 870 BA (70% in butyl acetate; manufactured by Bayer AG) | 51.15 | 51.15 |
|  | Additive | Baysilone Paint Additive OL17 (10% in xylene; manufactured by Borchers GmbH) | 0.53 | 0.53 |
|  |  | Modaflow (1% in xylene; manufactured by Monsanto Company) | 0.53 | 0.53 |
|  |  | Tinuvin 292 (10% in xylene; manufactured by Ciba Inc.) | 5.33 | 5.33 |
|  |  | Tinuvin 1130 (10% in xylene; manufactured by Ciba Inc.) | 10.67 | 10.67 |
|  |  | 1-Methoxypropylacetate-2/solvent naphtha 100 (1:1) | 10.17 | 10.17 |
|  |  | Butyl glycol acetate | 2.13 | 2.13 |
| Curing agent |  | Desmodur N 3390 Ba/SN (90% in butyl acetate/solvent naphtha 100 (1:1); manufactured by Bayer AG) | 19.49 | — |
|  |  | [Desmodur N 3390 Ba/SN (90% in butyl acetate/solvent naphtha 100 (1:1); manufactured by Bayer AG)]/3,5-dimethyl pyrazole (100:4.3) | — | 19.49 |
|  |  | [Desmodur N 3390 Ba/SN (90% in butyl acetate/solvent naphtha 100 (1:1); manufactured by Bayer AG)]/3,5-dimethyl pyrazole (100:21.5) | — | — |
| Total |  |  | 100 | 100 |

Example A1

The thermosetting clear coating material A (curing temperature=140° C., weight loss percentage (140° C.)=0% by mass) prepared in Preparation Example 7 was used as an uppermost layer-coating material. The noncurable and water-based base coating material A (weight loss percentage (140° C.)=0% by mass) prepared in Preparation Example 4 was used as a lower layer-coating material. The relative loss elastic modulus of the noncurable and water-based base coating material A when the thermosetting clear coating material A started to gel was $0.29 S^{-2}$.

The noncurable and water-based base coating material A prepared in Preparation Example 4 was applied to a surface of an electrodeposition-coated plate (product name "Sacsade80V gray" manufactured by Shinto-Herberts Automotive Systems Co., Ltd.) so that the film thickness thereof after heat treatments was to be 20 μm. The plate was heated at 80° C. for 3 minutes to evaporate water, the organic solvents, and the like. Next, to this layer of the noncurable and water- Moreover, along with the mass measurement, the wave scan values [Wa (wavelength: <0.3 mm), Wb (wavelength: 0.3 to 1 mm), Wc (wavelength: 1 to 3 mm), and Wd (wavelength: 3 to 10 mm)] were measured using a wave scan (Wave-Scan Dual manufactured by BYK-Gardner, Inc.). Regarding to these wave scan values, a smaller Wa means excellent in gloss, and a smaller Wd means excellent in surface texture.

Figure 2:
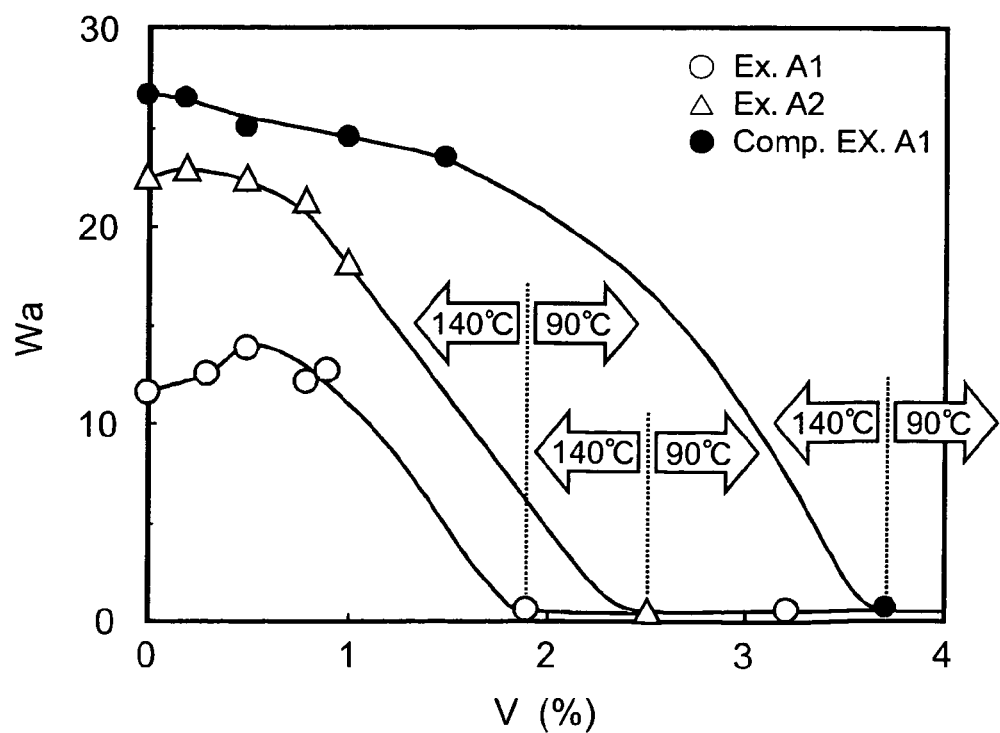
FIG. 2 is a graph showing a relationship between a concentration V of a volatile component and a wave scan value Wa during heat treatments of multilayer coating films prepared in Examples A1 and A2 and Comparative Example A1.

Table 2 shows the Wa to Wd of the multilayer coating film after the heat treatments. Additionally, FIG. 2 shows a relationship between the V and the Wa during the heat treatments.

Example A2

A multilayer coating film was prepared in the same manner as in Example A1, except that the thermosetting clear coating material B (curing temperature=140° C., weight loss percentage (140° C.)=1.5% by mass) prepared in Preparation Example 8 was used as a clear coating material in place of the thermosetting clear coating material A. Then, the multilayer coating film was subjected to the determination of V and the measurement of Wa to Wd. Note that the relative loss elastic modulus of the noncurable and water-based base coating material A when the thermosetting clear coating material B started to gel was 0.35 s$^{-2}$.

Table 2 shows the Wa to Wd of the multilayer coating film after the heat treatments. Additionally, FIG. 2 shows a relationship between the V and the Wa during the heat treatments.

Comparative Example A1

A multilayer coating film was prepared in the same manner as in Example A1, except that the thermosetting and water-based base coating material B (curing temperature=140° C., weight loss percentage (140° C.)=1.6% by mass) prepared in Preparation Example 5 was used as a base coating material in place of the noncurable and water-based base coating material A. Then, the multilayer coating film was subjected to the determination of V and the measurement of Wa to Wd. Note that the relative loss elastic modulus of the thermosetting and water-based base coating material B when the thermosetting clear coating material A started to gel was 1.1 s$^{-2}$. Moreover, the curing of the thermosetting and water-based base coating material B proceeded by a condensation reaction between the melamine resin and hydroxy groups of the acrylic resin. This condensation reaction caused a volatile alcohol and water to be formed.

Table 2 shows the Wa to Wd of the multilayer coating film after the heat treatments. Additionally, FIG. 2 shows a relationship between the V and the Wa during the heat treatments.

TABLE 2

|  | Wa | Wb | Wc | Wd |
|---|---|---|---|---|
| Ex. A1 | 11.5 | 10.9 | 5.2 | 5.7 |
| Ex. A2 | 22.6 | 23.2 | 10.6 | 11.8 |
| Comp. Ex. A1 | 26.6 | 31.7 | 14.8 | 13.8 |

The multilayer coating film (Example A2) was obtained by using the noncurable and water-based base coating material for the lower layer below the uppermost layer and using the thermosetting clear coating material for the uppermost layer, provided that the thermosetting clear coating material shrinks when the curing reaction involving a deblocking reaction is caused by the heat treatment. Meanwhile, the multilayer coating film (Comparative Example A1) was obtained by using the thermosetting and water-based base coating material for the lower layer below the uppermost layer and using the thermosetting clear coating material for the uppermost layer, provided that the thermosetting clear coating material does not shrink in the curing reaction by the heat treatment. As apparent from the results shown in Table 2, it was found out that all of Wa to Wd of the multilayer coating film of Example A2 of the present invention were respectively smaller than those of the multilayer coating film of Comparative Example A1, and that the multilayer coating film of Example A2 was more excellent in both gloss and surface texture than the multilayer coating film of Comparative Example A1. Furthermore, the multilayer coating film (Example A1) was obtained by using the noncurable and water-based base coating material for the lower layer below the uppermost layer and using the thermosetting clear coating material for the uppermost layer, provided that the thermosetting clear coating material does not shrink in the curing reaction by the heat treatment. It was found out that all of Wa to Wd of the multilayer coating film of Example A1 was approximately ½ of those of the multilayer coating film of Example A2, and was ½ or smaller than those of the multilayer coating film of Comparative Example A1, and that the multilayer coating film of Example A1 was extremely excellent in both gloss and surface texture.

Moreover, the multilayer coating films (Examples A1 and A2) were each obtained by a wet-on-wet technique using, for the lower layer below the uppermost layer, the coating material having a relative loss elastic modulus of 1 s$^{-2}$ or less when the uppermost layer-coating material started to gel, in accordance with the present invention. Meanwhile, the multilayer coating film (Comparative Example A1) was obtained by using, for the lower layer below the uppermost layer, the coating material having a relative loss elastic modulus exceeding 1 s$^{-2}$ when the uppermost layer-coating material started to gel. It was found out that all of Wa to Wd of the multilayer coating films of Examples A1 and A2 were smaller than those of the multilayer coating film of Comparative Example A1 (particularly, all of Wa to Wd of the multilayer coating film of Example A1 were respectively ½ or smaller than those of the multilayer coating film of Comparative Example A1), and that the multilayer coating films of Examples A1 and A2 were more improved in both gloss and surface texture than the multilayer coating film of Comparative Example A1 (particularly, the multilayer coating film of Example A1 was significantly improved).

As shown in FIG. 2, by the heat treatment at 90° C., the concentration V of a volatile component in the multilayer coating film of Example A1 was reduced to approximately 2% by mass; the concentration V of a volatile component in the multilayer coating film of Example A2 was reduced to approximately 2.5% by mass; meanwhile, that in the multilayer coating film of Comparative Example A1 was reduced only to approximately 4% by mass. As a result, at the time of the heat treatment at 140° C., as much as approximately 4% by mass of the concentration V of a volatile component was reduced in Comparative Example A1; meanwhile, the reduction in the concentration V of a volatile component was suppressed to approximately 20 by mass in Example A1, and the reduction in the concentration V of a volatile component was suppressed to approximately 2.5% by mass in Example A2. Note that the concentration V of a volatile component in Example A2 includes the volatile component formed in the deblocking reaction by the heat treatment at 140° C.

As apparent from the results shown in FIG. 2 and Table 2, it was found out that the smaller the decreased amount of the concentration V of a volatile component at the time of the heat treatment at 140° C. (Example A1<Example A2<Comparative Example A1), the smaller the Wa to Wd was (Example A1<Example A2<Comparative Example A1). Thus, it was found out that the multilayer coating film of Example A1 was the most excellent in gloss and surface texture, the multilayer coating film of Example A2 was the second most excellent, and the multilayer coating film of Comparative Example A1 was poor in gloss and surface texture.

In any of the multilayer coating films of Examples A1 and A2 and Comparative Example A1, the curing of the thermosetting clear coating material is started by the heat treatment at 140° C. (also in Example A2, the deblocking reaction rapidly occurred, and the curing reaction similar to that in Example A1 occurred immediately.) After the fluidity of the layer made from the thermosetting clear coating material significantly decreases because of the curing, the shrinkage of the multilayer coating film occurs to the extent corresponding to the decreased amount of the concentration V of a volatile component at the time of the heat treatment at 140° C. Accordingly, it was found out that, the smaller the decreased amount of the concentration V of a volatile component at the time of the heat treatment at 140° C., the more certainly the shrinkage was restrained after the fluidity of the layer made from the thermosetting clear coating material significantly decreased because of the curing. As a result, the formation (significant existence) of the surface unevenness of the multilayer coating film was more restrained, Wa to Wd became smaller, and the gloss and surface texture were more improved.

Example A3

A multilayer coating film was prepared in the same manner as in Example A1, except that a base compound for a polyurethane resin-based thermosetting coating material (product name "Retan PG60 modified" manufactured by Kansai Paint Co., Ltd., two-pack type (curing agent: isocyanate compound)) was used as a noncurable and solvent-based base coating material in place of the noncurable and water-based base coating material A, and that this noncurable and solvent-based base coating material was applied so that the film thickness thereof after heat treatments was to be 25 μm. Then, the multilayer coating film was subjected to the determination of V and the measurement of Wa to Wd. Note that the weight loss percentage of the noncurable and solvent-based base coating material (the base compound for the polyurethane resin-based thermosetting coating material) at 140° C. was 0% by mass. Moreover, the relative loss elastic modulus of the noncurable and solvent-based base coating material when the thermosetting clear coating material A started to gel was 0.16 $s^{-2}$.

Figure 3:
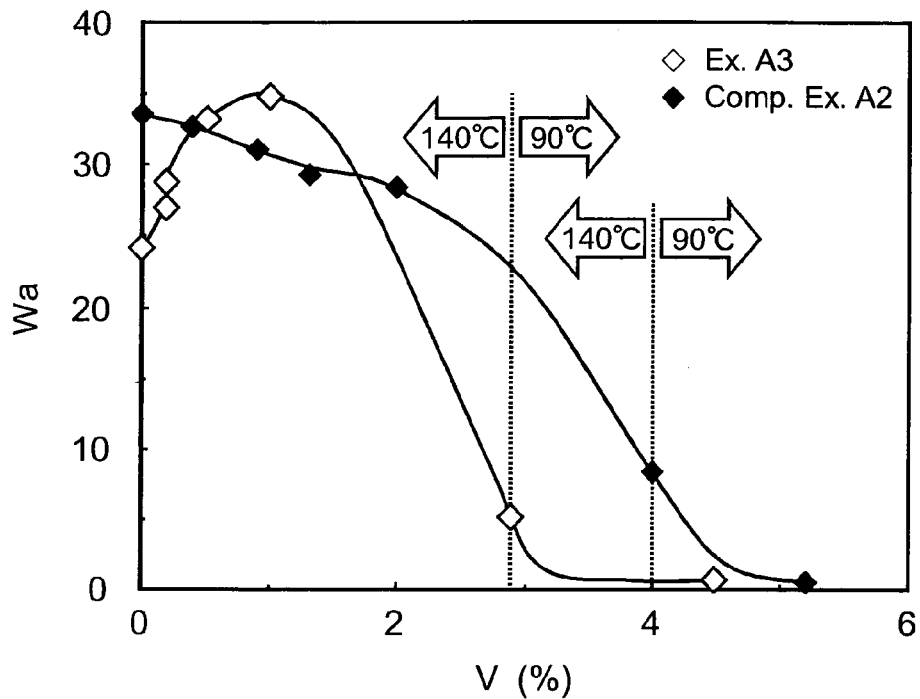
FIG. 3 is a graph showing a relationship between a concentration V of a volatile component and a wave scan value Wa during heat treatments of multilayer coating films prepared in Example A3 and Comparative Example A2.

Table 3 shows the Wa to Wd of the multilayer coating film after the heat treatments. Additionally, FIG. 3 shows a relationship between the V and the Wa during the heat treatments.

Comparative Example A2

A multilayer coating film was prepared in the same manner as in Comparative Example A1, except that the thermosetting and water-based base coating material B was applied so that the film thickness thereof after heat treatments was to be 25 μm. Then, the multilayer coating film was subjected to the determination of V and the measurement of Wa to Wd.

Table 3 shows the Wa to Wd of the multilayer coating film after the heat treatments. Additionally, FIG. 3 shows a relationship between the V and the Wa during the heat treatments.

TABLE 3

|  | Wa | Wb | Wc | Wd |
| --- | --- | --- | --- | --- |
| Ex. A3 | 24.2 | 28.2 | 16.5 | 10.9 |
| Comp. Ex. A2 | 33.6 | 35 | 18.3 | 17.1 |

The multilayer coating film (Example A3) was obtained by a wet-on-wet technique using the noncurable and solvent-based base coating material for the lower layer below the uppermost layer, in accordance with the present invention. Meanwhile, the multilayer coating film (Comparative Example A2) was obtained by using the thermosetting and water-based base coating material for the lower layer below the uppermost layer. As apparent from the results shown in Table 3, it was found out that all of Wa to Wd of the multilayer coating film of Example A3 were respectively smaller than those of the multilayer coating film of Comparative Example A2, and that the multilayer coating film of Example A3 was more improved in both gloss and surface texture than the multilayer coating film of Comparative Example A2.

Moreover, the multilayer coating film (Example A3) was obtained by a wet-on-wet technique using, for the lower layer below the uppermost layer, the coating material having a relative loss elastic modulus of 1 $s^{-2}$ or less when the uppermost layer-coating material started to gel, in accordance with the present invention. Meanwhile, the multilayer coating film (Comparative Example A2) was obtained by using, for the lower layer below the uppermost layer, the coating material having a relative loss elastic modulus exceeding 1 $s^{-2}$ when the uppermost layer-coating material started to gel. It was found out that all of Wa to Wd of the multilayer coating film of Example A3 were respectively smaller than those of the multilayer coating film of Comparative Example A2, and that the multilayer coating film of Example A3 was more improved in both gloss and surface texture than the multilayer coating film of Comparative Example A2.

As shown in FIG. 3, by the heat treatment at 90° C., the concentration V of a volatile component in the multilayer coating film of Example A3 was reduced to approximately 3% by mass; meanwhile, that in the multilayer coating film of Comparative Example A2 was reduced only to approximately 4% by mass. As a result, at the time of the heat treatment at 140° C., as much as approximately 4% by mass of the concentration V of a volatile component was reduced in Comparative Example A2; meanwhile, the reduction in the concentration V of a volatile component was suppressed to approximately 3% by mass in Example A3. This reduction in the concentration V of a volatile component at the time of the heat treatment at 140° C. corresponds to the shrinkage of the multilayer coating film. Thus, it was found out that, after the fluidity of the layer made from the thermosetting and solvent-based clear coating material significantly decreased because of the curing at the time of the heat treatment at 140° C., the shrinkage of the multilayer coating film of Example A3 was certainly restrained in comparison with the multilayer coating film of Comparative Example A2. As a result, the formation (significant existence) of the surface unevenness of the multilayer coating film of Example A2 was restrained, all the Wa to Wd thereof became smaller, and the gloss and surface texture thereof were more improved than those of the multilayer coating film of Comparative Example A2.

Example A4

The thermosetting clear coating material A (curing temperature=140° C., weight loss percentage (140° C.)=0% by mass) prepared in Preparation Example 7 was used as an uppermost layer-coating material. The thermosetting and water-based intermediate coating material A (curing temperature=140° C., weight loss percentage (140° C.)=1.6% by mass) prepared in Preparation Example 1 and the noncurable and water-based base coating material A (weight loss percentage (140° C.)=0% by mass) prepared in Preparation Example 4 were used as lower layer-coating materials. Note that the relative loss elastic moduli of the thermosetting and water-based intermediate coating material A and the noncurable and water-based base coating material A when the thermosetting clear coating material A started to gel were 4.7 $s^{-2}$ and 0.29 $s^{-2}$, respectively. Moreover, the curing of the thermosetting and water-based intermediate coating material A proceeds by a condensation reaction between the melamine resin and hydroxy groups of the acrylic resin. This condensation reaction causes a volatile alcohol and water to be formed.

A multilayer coating film was prepared in the same manner as in Example A1, except for the following procedure. Specifically, the thermosetting and water-based intermediate coating material A prepared in Preparation Example 1 was applied to a surface of an electrodeposition-coated plate (product name "Sacsade80V gray" manufactured by Shinto-Herberts Automotive Systems Co., Ltd.) so that the film thickness thereof after heat treatments was to be 20 μm. The plate was heated at 100° C. for 3 minutes to evaporate water, the organic solvents, and the like. To this layer of the thermosetting and water-based intermediate coating material A, the noncurable and water-based base coating material A prepared in Preparation Example 4 was applied so that the film thickness thereof after heat treatments was to be 15 μm. The plate was heated at 80° C. for 3 minutes to evaporate water, the organic solvents, and the like. To this layer of the noncurable and water-based base coating material A, the thermosetting clear coating material A prepared in Preparation Example 7 was applied so that the film thickness thereof after heat treatments was to be 35 μm. Then, the multilayer coating film was subjected to the determination of V and the measurement of Wa to Wd.

Figure 4:
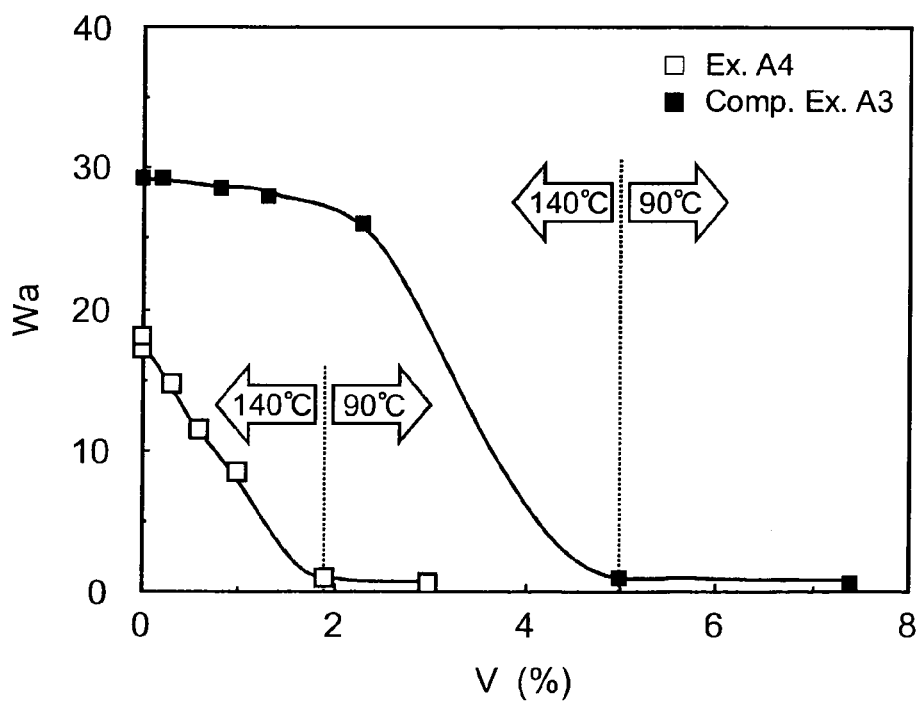
FIG. 4 is a graph showing a relationship between a concentration V of a volatile component and a wave scan value Wa during heat treatments of multilayer coating films prepared in Example A4 and Comparative Example A3.

Table 4 shows the Wa to Wd of the multilayer coating film after the heat treatments. Additionally, FIG. 4 shows a relationship between the V and the Wa during the heat treatments.

Comparative Example A3

A multilayer coating film was prepared in the same manner as in Example A4, except that the thermosetting and water-based intermediate coating material B (curing temperature=140° C., weight loss percentage (140° C.)=3.3% by mass) prepared in Preparation Example 2 was used as an intermediate coating material of lower layer-coating materials in place of the thermosetting and water-based intermediate coating material A, and that the thermosetting and water-based base coating material B (curing temperature=140° C., weight loss percentage (140° C.)=1.6% by mass) prepared in Preparation Example 5 was used as a base coating material thereof in place of the noncurable and water-based base coating material A. Then, the multilayer coating film was subjected to the determination of V and the measurement of Wa to Wd. Note that the relative loss elastic moduli of the thermosetting and water-based intermediate coating material B and the thermosetting and water-based base coating material B when the thermosetting clear coating material A started to gel were 7.5 s$^{-2}$ and 1.1 s$^{-2}$, respectively. Moreover, the curing of the thermosetting and water-based intermediate coating material B and the thermosetting and water-based base coating material B proceeded by a condensation reaction between the melamine resin and hydroxy groups of the acrylic resin. This condensation reaction caused a volatile alcohol and water to be formed.

Table 4 shows the Wa to Wd of the multilayer coating film after the heat treatments. Additionally, FIG. 4 shows a relationship between the V and the Wa during the heat treatments.

TABLE 4

|  | Wa | Wb | Wc | Wd |
|---|---|---|---|---|
| Ex. A4 | 18 | 28.5 | 13.1 | 12.5 |
| Comp. Ex. A3 | 29.2 | 37.9 | 21.7 | 20.1 |

The multilayer coating film (Example A4) was obtained by a wet-on-wet technique using the noncurable and water-based base coating material for at least one layer of the lower layers below the uppermost layer, in accordance with the present invention. Meanwhile, the multilayer coating film (Comparative Example A3) was obtained by using only a thermosetting and water-based base coating material for all the lower layers below the uppermost layer. As apparent from the results shown in Table 4, it was found out that all of Wa to Wd of the multilayer coating film of Example A4 were respectively smaller than those of the multilayer coating film of Comparative Example A3, and that the multilayer coating film of Example A4 was more improved in both gloss and surface texture than the multilayer coating film of Comparative Example A3.

Moreover, the multilayer coating film (Example A4) was obtained by a wet-on-wet technique using, for at least one layer of the lower layers below the uppermost layer, the coating material having a relative loss elastic modulus of 1 s$^{-2}$ or less when the uppermost layer-coating material started to gel, in accordance with the present invention. Meanwhile, the multilayer coating film (Comparative Example A3) was obtained by using, for all the lower layers below the uppermost layer, the coating material having a relative loss elastic modulus exceeding 1 s$^{-2}$ when the uppermost layer-coating material started to gel. It was found out that all of Wa to Wd of the multilayer coating film of Example A4 were respectively smaller than those of the multilayer coating film of Comparative Example A3, and that the multilayer coating film of Example A4 was more improved in both gloss and surface texture than the multilayer coating film of Comparative Example A3.

As shown in FIG. 4, by the heat treatment at 90° C., the concentration V of a volatile component in the multilayer coating film of Example A4 was reduced to approximately 2% by mass; meanwhile, that in the multilayer coating film of Comparative Example A3 was reduced only to approximately 5% by mass. As a result, in the heat treatment at 140° C., as much as approximately 5% by mass of the concentration V of a volatile component was reduced in Comparative Example A3; meanwhile, the reduction in the concentration V of a volatile component was suppressed to approximately 2% by mass in Example A4. This reduction in the concentration V of a volatile component in the heat treatment at 140° C. corresponds to the shrinkage of the multilayer coating film. Thus, it was found out that, after the fluidity of the layer made from the thermosetting and solvent-based clear coating material significantly decreased because of the curing at the time of the heat treatment at 140° C., the shrinkage of the multilayer coating film of Example A4 was certainly restrained in comparison with the multilayer coating film of Comparative Example A3. As a result, the formation (significant existence) of the surface unevenness of the multilayer coating film of Example A4 was restrained, all the Wa to Wd thereof became smaller, and the gloss and surface texture thereof were more improved than those of the multilayer coating film of Comparative Example A3.

Example B1

The isocyanate-curable clear coating material A (curing temperature=140° C., weight loss percentage (140° C.)=0% by mass) prepared in Preparation Example 7 was used as an uppermost layer-coating material. A blocked isocyanate-curable and solvent-based base coating material A (product name "SFX800" manufactured by Kansai Paint Co., Ltd.) having a curing temperature $T_U$ of 80° C. was used as a lower layer-thermosetting coating material. Note that the isocyanate-curable clear coating material A was cured by an addition reaction of the isocyanate compound, and thereby substantially no volatile product was formed. Moreover, the blocked isocyanate-curable base coating material A was cured by an addition reaction of the isocyanate compound that was formed by a deblocking reaction of the blocked isocyanate. This deblocking reaction caused a volatile blocking agent to be formed. The relative loss elastic modulus of the blocked isocyanate-curable base coating material A when the isocyanate-curable clear coating material A started to gel was 0.60 s$^{-2}$.

The blocked isocyanate-curable base coating material A was applied to a surface of an electrodeposition-coated plate (product name "Sacsade80V gray" manufactured by Shinto-Herberts Automotive Systems Co., Ltd.) so that the film thickness thereof after heat treatments was to be 25 μm. The plate was heated at 60° C. for 10 minutes to evaporate the organic solvents. Next, to this layer of the blocked isocyanate-curable base coating material A, the isocyanate-curable clear coating material A (curing temperature=140° C., weight loss percentage (140° C.)=0% by mass) was applied so that the film thickness thereof after heat treatments was to be 35 μm. Thus, an uncured multilayer coating film in which the blocked isocyanate-curable base coating material A and the isocyanate-curable clear coating material A were applied using a wet-on-wet technique was obtained. This uncured multilayer coating film was allowed to stand (subjected to flash) at room temperature for 10 minutes, and then a low-temperature heat treatment at 90° C. for 10 minutes was performed to thereby cure the blocked isocyanate-curable base coating material A. Subsequently, a high-temperature heat treatment at 140° C. for 30 minutes was performed to thereby cure the isocyanate-curable clear coating material A. During this period, the mass Wt (unit: g) of the multilayer coating film was measured at a predetermined timing, and the concentration V of a volatile component (unit: by mass) in the multilayer coating film was calculated according to the formula (6).

$$V=(Wt-We)/Wt\times 100 \quad (6)$$

In the formula (6), We is the mass (unit: g) of the obtained multilayer coating film.

Moreover, along with the mass measurement, the wave scan values [Wa (wavelength: <0.3 mm), Wb (wavelength: 0.3 to 1 mm), Wc (wavelength: 1 to 3 mm), and Wd (wavelength: 3 to 10 mm)] were measured using a wave scan (Wave-Scan Dual manufactured by BYK-Gardner, Inc.). Regarding to these wave scan values, a smaller Wa means excellent in gloss, and a smaller Wd means excellent in surface texture.

Figure 5:
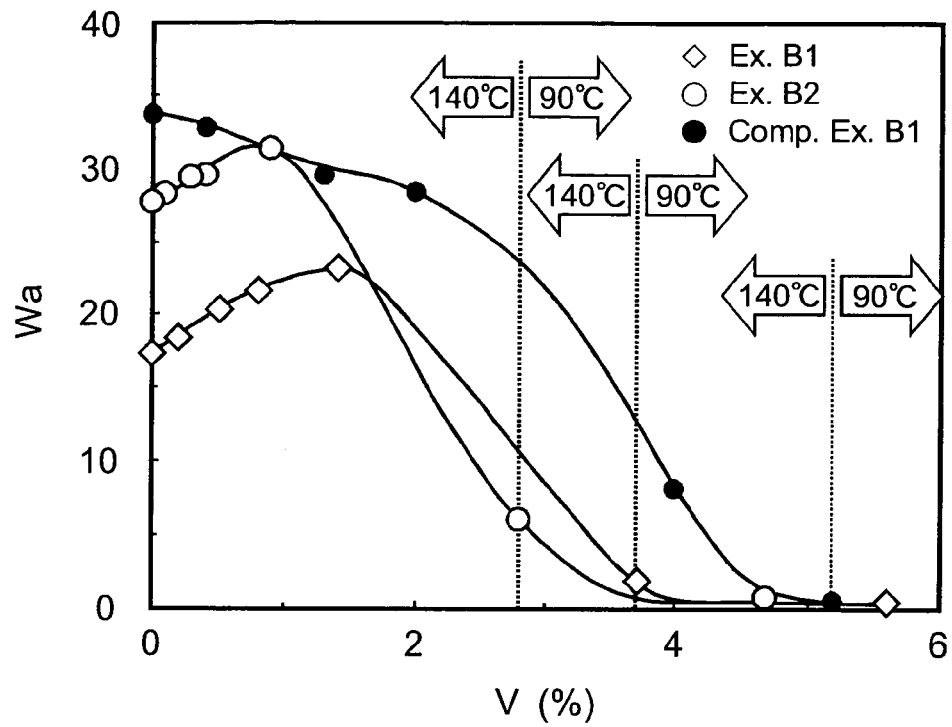
FIG. 5 is a graph showing a relationship between a concentration V of a volatile component and a wave scan value Wa during heat treatments of multilayer coating films prepared in Examples B1 and B2 and Comparative Example B1.

Table 5 shows the Wa to Wd of the obtained multilayer coating film. Additionally, FIG. 5 shows a relationship between the V and the Wa during the heat treatments.

Example B2

A multilayer coating film was prepared in the same manner as in Example B1, except that an isocyanate-curable (two-pack type) and solvent-based base coating material B (product name "Retan PG60 modified" manufactured by Kansai Paint Co., Ltd.) having a curing temperature $T_U$ of 80° C. was used as a lower layer-thermosetting coating material in place of the blocked isocyanate-curable and solvent-based base coating material A. Then, the multilayer coating film was subjected to the determination of V and the measurement of Wa to Wd. Note that the isocyanate-curable base coating material B was cured by an addition reaction of the isocyanate compound, and thereby substantially no volatile product was formed. Moreover, the relative loss elastic modulus of the isocyanate-curable base coating material B when the isocyanate-curable clear coating material A started to gel was 0.30 s$^{-2}$.

Table 5 shows the Wa to Wd of the obtained multilayer coating film. Additionally, FIG. 5 shows a relationship between the V and the Wa during the heat treatments.

Comparative Example B1

A multilayer coating film was prepared in the same manner as in Example B1 by performing a two-stage heat treatment (90° C. and 140° C.), except that the melamine-curable and water-based base coating material B (curing temperature=140° C.) prepared in Preparation Example 5 was used as a lower layer-thermosetting coating material in place of the blocked isocyanate-curable and solvent-based base coating material A (curing temperature=80° C.). Then, the multilayer coating film was subjected to the determination of V and the measurement of Wa to Wd. Note that the curing of the melamine-curable base coating material B proceeded by a condensation reaction between the melamine resin and hydroxy groups of the acrylic resin. This condensation reaction caused a volatile alcohol and water to be formed. Moreover, the relative loss elastic modulus of the melamine-curable base coating material B when the isocyanate-curable clear coating material A started to gel was 1.1 s$^{-2}$.

Table 5 shows the Wa to Wd of the obtained multilayer coating film. Additionally, FIG. 5 shows a relationship between the V and the Wa during the heat treatments.

TABLE 5

|  | Wa | Wb | Wc | Wd |
|---|---|---|---|---|
| Ex. B1 | 17.4 | 23.1 | 10.2 | 8.6 |
| Ex. B2 | 27.6 | 24 | 14 | 12.6 |
| Comp. Ex. B1 | 33.6 | 35 | 18.3 | 17.1 |

The multilayer coating films (Examples B1 and B2) were each obtained by: forming the lower layer using the thermosetting coating material that is cured at a temperature lower than the temperature at which the uppermost layer is cured; curing the lower layer by performing a heat treatment at low temperature; and subsequently curing the uppermost layer by performing a heat treatment at high temperature, in accordance with the present invention. Meanwhile, the multilayer coating film (Comparative Example B1) was obtained by: forming the uppermost layer and the lower layer using thermosetting coating materials having the same curing temperature; and curing the uppermost layer and the lower layer by subjecting both of the layers to the heat treatment simultaneously. As apparent from the results shown in Table 5, it was found out that all of Wa to Wd of the multilayer coating films of Examples B1 and B2 were respectively more reduced than those of the multilayer coating film of Comparative Example B1, and that the multilayer coating films of Examples B1 and B2 were more improved in both gloss and surface texture than the multilayer coating film of Comparative Example B1.

Furthermore, the multilayer coating films (Examples B1 and B2) were each obtained by a wet-on-wet technique using, for the lower layer below the uppermost layer, the coating material having a relative loss elastic modulus of 1 s$^{-2}$ or less when the uppermost layer-coating material started to gel, in accordance with the present invention. Meanwhile, the multilayer coating film (Comparative Example B1) was obtained by using, for the lower layer below the uppermost layer, the coating material having a relative loss elastic modulus, exceeding 1 s$^{-2}$ when the uppermost layer-coating material started to gel. It was found out that all of Wa to Wd of the multilayer coating films of Examples B1 and B2 were respectively more reduced than those of the multilayer coating film of Comparative Example B1 (particularly, those of the multilayer coating film of Example B1 were significantly reduced), and that the multilayer coating films of Examples B1 and B2 were more improved in both gloss and surface texture than the multilayer coating film of Comparative Example B1 (particularly, the multilayer coating film of Example B1 was significantly improved).

As shown in FIG. 5, by the low-temperature heat treatment, the concentrations V of a volatile component in the multilayer coating films of Examples B1 and B2 were reduced to approximately 4% by mass and approximately 3% by mass, respectively; meanwhile, that of the multilayer coating film of Comparative Example B1 was reduced only to approximately 5% by mass. As a result, by the high-temperature heat treatment, as much as approximately 5% by mass of the concentration V of a volatile component was reduced in Comparative Example B1; meanwhile, the reductions in the concentrations V of a volatile component were suppressed to approximately 4% by mass and approximately 3% by mass in Examples B1 and B2, respectively.

As apparent from the results shown in FIG. 5 and Table 5, it was found out that the multilayer coating films (Examples B1 and B2) having smaller decreased amounts of the concentrations V of a volatile component at the time of the heat treatment at 140° C. had Wa to Wd of which all were smaller than those of the multilayer coating film (Comparative Example B1) having a larger decreased amount of the concentration V of a volatile component at the time of the heat treatment at 140° C. Thus, the multilayer coating films (Examples B1 and B2) were excellent in gloss and surface texture in comparison with the multilayer coating film (Comparative Example B1).

In any of the multilayer coating films of Examples B1 and B2 and Comparative Example B1, the curing of the thermosetting clear coating material is started by the heat treatment at 140° C. After the fluidity of the layer made from the clear coating material significantly decreases because of the curing, the shrinkage of the multilayer coating film occurs to the extent corresponding to the decreased amount of the concentration V of a volatile component by this high-temperature heat treatment. Accordingly, it was found out that, regarding to the multilayer coating films of Examples B1 and B2 having smaller decreased amounts of the concentrations V of a volatile component at the time of the high-temperature heat treatment, the shrinkage due to the high-temperature heat treatment was certainly restrained in comparison with the multilayer coating film of Comparative Example B1 having a larger decreased amount of the concentration V of a volatile component. As a result, the formation (significant existence) of the surface unevenness of the multilayer coating films of Examples B1 and B2 was restrained, the Wa to Wd thereof became smaller, and the gloss and surface texture thereof were more improved than the multilayer coating film of Comparative Example B1.

Example B3

The isocyanate-curable clear coating material A (curing temperature=140° C., weight loss percentage (140° C.)=0% by mass) prepared in Preparation Example 7 was used as an uppermost layer-coating material. An isocyanate-curable (two-pack type) and solvent-based intermediate coating material A (product name "SFX5333" manufactured by Kansai Paint Co., Ltd.) having a curing temperature $T_U$ of 80° C. was used as a thermosetting intermediate coating material. Moreover, the blocked isocyanate-curable base coating material A (curing temperature=80° C.) used in Example B1 was used as a thermosetting base coating material. Note that the isocyanate-curable clear coating material A and the isocyanate-curable intermediate coating material A were cured by an addition reaction of the isocyanate compound, and thereby substantially no volatile product was formed. Moreover, the blocked isocyanate-curable base coating material A was cured by an addition reaction of the isocyanate compound that was formed by a deblocking reaction of the blocked isocyanate. This deblocking reaction caused a volatile blocking agent to be formed. The relative loss elastic moduli of the isocyanate-curable intermediate coating material A and the blocked isocyanate-curable base coating material A when the isocyanate-curable clear coating material A started to gel were 17 $s^{-2}$ and 0.60 $s^{-2}$, respectively.

A multilayer coating film was prepared in the same manner as in Example B1, except for the following procedure. Specifically, the isocyanate-curable intermediate coating material A, serving as a first lower layer, was applied to a surface of an electrodeposition-coated plate (product name "Sacsade80V gray" manufactured by Shinto-Herberts Automotive Systems Co., Ltd.) so that the film thickness thereof after heat treatments was to be 20 μm. The plate was heated at 60° C. for 10 minutes to evaporate the organic solvents and the like. To this layer of the isocyanate-curable intermediate coating material A, the blocked isocyanate-curable base coating material A (curing temperature=80° C.), serving as a second lower layer, was applied so that the film thickness thereof after heat treatments was to be 15 μm. The plate was heated at 60° C. for 10 minutes to evaporate the organic solvents and the like. To this layer of the blocked isocyanate-curable base coating material A, the isocyanate-curable clear coating material A (curing temperature=140° C., weight loss percentage (140° C.)=0% by mass) was applied so that the film thickness thereof after heat treatments was to be 35 μm. Then, the multilayer coating film was subjected to the determination of V and the measurement of Wa to Wd.

Figure 6:
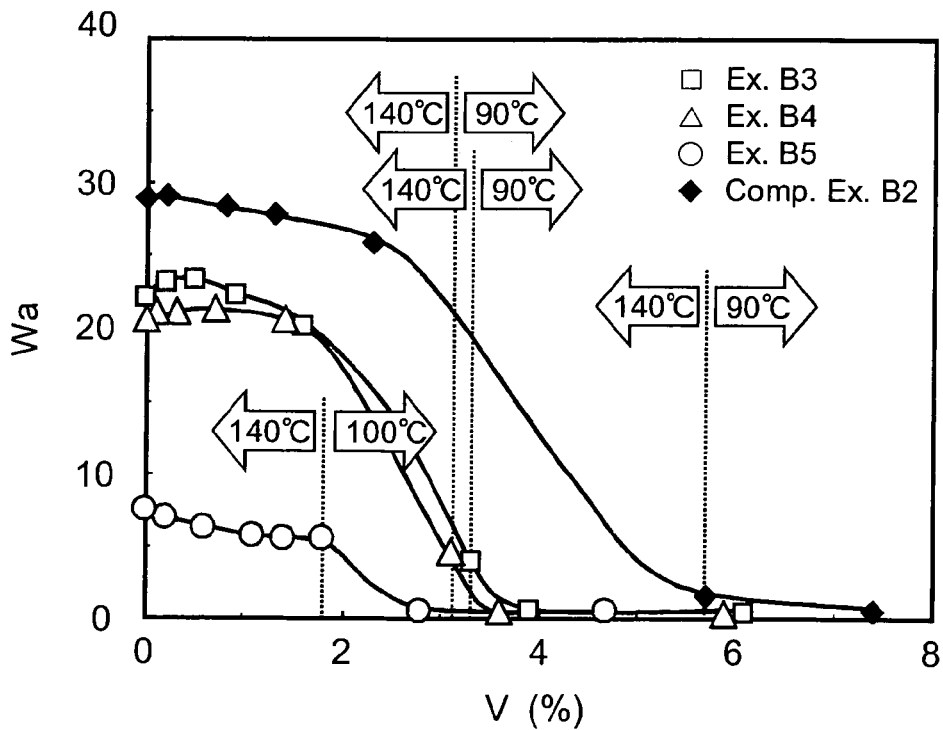
FIG. 6 is a graph showing a relationship between a concentration V of a volatile component and a wave scan value Wa during heat treatments of multilayer coating films prepared in Examples B3 to B5 and Comparative Example B2.

Table 6 shows the Wa to Wd of the obtained multilayer coating film. Additionally, FIG. 6 shows a relationship between the V and the Wa during the heat treatments.

Example B4

A multilayer coating film was prepared in the same manner as in Example B3, except that a base compound for the isocyanate-curable intermediate coating material A (two-pack type (curing agent: isocyanate compound)) used in Example B3 was used as a noncurable and solvent-based intermediate coating material in place of the isocyanate-curable intermediate coating material A. Then, the multilayer coating film was subjected to the determination of V and the measurement of Wa to Wd. Note that the noncurable intermediate coating material undergoes no curing reaction, and thereby no volatile product is formed by the curing reaction. Moreover, the relative loss elastic modulus of the noncurable intermediate coating material when the isocyanate-curable clear coating material A started to gel was 12.5 $s^{-2}$.

Table 6 shows the Wa to Wd of the obtained multilayer coating film. Additionally, FIG. 6 shows a relationship between the V and the Wa during the heat treatments.

Example B5

The isocyanate-curable clear coating material A (curing temperature=140° C., weight loss percentage (140° C.)=0% by mass) prepared in Preparation Example 7 was used as an uppermost layer-coating material. A blocked isocyanate-curable and solvent-based intermediate coating material B (product name "SFX3300CD" manufactured by Kansai Paint Co., Ltd.) having a curing temperature $T_U$ of 90° C. was used as a thermosetting intermediate coating material. Moreover, a blocked isocyanate-curable and solvent-based base coating material C (product name "SFX420" manufactured by Kansai Paint Co., Ltd.) having a curing temperature $T_U$ of 90° C. was used as a thermosetting base coating material. Note that the isocyanate-curable clear coating material A was cured by an addition reaction of the isocyanate compound, and thereby substantially no volatile product was formed. Moreover, the blocked isocyanate-curable intermediate coating material B and the blocked isocyanate-curable base coating material C were cured by an addition reaction of the isocyanate compound that is formed by a deblocking reaction of the blocked isocyanate. This deblocking reaction caused a volatile blocking agent to be formed. The relative loss elastic moduli of the blocked isocyanate-curable intermediate coating material B and the blocked isocyanate-curable base coating material C when the isocyanate-curable clear coating material A started to gel were 0.70 s$^{-2}$ and 0.09 s$^{-2}$, respectively.

A multilayer coating film was prepared in the same manner as in Example B3 except for the following procedure. Specifically, the blocked isocyanate-curable intermediate coating material B was used as a first lower layer-thermosetting coating material in place of the isocyanate-curable intermediate coating material A (curing temperature=80° C.). The blocked isocyanate-curable base coating material C was used as a second lower layer-thermosetting coating material in place of the blocked isocyanate-curable base coating material A (curing temperature=80° C.). The heating condition in the first stage was altered to heating at 100° C. for 10 minutes. Then, the multilayer coating film was subjected to the determination of V and the measurement of Wa to Wd.

Table 6 shows the Wa to Wd of the obtained multilayer coating film. Additionally, FIG. 6 shows a relationship between the V and the Wa during the heat treatments.

Comparative Example B2

A multilayer coating film was prepared in the same manner as in Example B3 by performing a two-stage heat treatment (90° C. and 140° C.), except that the melamine-curable and water-based intermediate coating material a (curing temperature=140° C.) prepared in Preparation Example 3 was used as a first lower layer-thermosetting coating material in place of the isocyanate-curable intermediate coating material A (curing temperature=80° C.), and that the melamine-curable and water-based base coating material B (curing temperature=140° C.) prepared in Preparation Example 5 was used as a second lower layer-thermosetting coating material in place of the blocked isocyanate-curable base coating material A (curing temperature=80° C.). Then, the multilayer coating film was subjected to the determination of V and the measurement of Wa to Wd. Note that the curing of the melamine-curable base coating material B and the melamine-curable intermediate coating material a proceeded by a condensation reaction between the melamine resin and hydroxy groups of the acrylic resin. This condensation reaction caused a volatile alcohol and water to be formed. Moreover, the relative loss elastic moduli of the melamine-curable and water-based intermediate coating material a and the melamine-curable and water-based base coating material B when the isocyanate-curable clear coating material A started to gel were 7.5 s$^{-2}$ and 1.1 s$^{-2}$, respectively.

Table 6 shows the Wa to Wd of the obtained multilayer coating film. Additionally, FIG. 6 shows a relationship between the V and the Wa during the heat treatments.

TABLE 6

|  | Wa | Wb | Wc | Wd |
|---|---|---|---|---|
| Ex. B3 | 22.1 | 29.6 | 14.9 | 12.7 |
| Ex. B4 | 20.6 | 27.4 | 13.4 | 11.6 |
| Ex. B5 | 7.4 | 14.8 | 8.9 | 10.7 |
| Comp. Ex. B2 | 29 | 37.9 | 21.7 | 20.1 |

The multilayer coating films (Examples B3 to B5) were each obtained by: using, as the lower layer-thermosetting coating material for at least one lower layer below the uppermost layer, the thermosetting coating material that is cured at a temperature lower than the temperature at which the uppermost layer is cured; curing the lower layer by performing a heat treatment at low temperature; and subsequently curing the uppermost layer by performing a heat treatment at high temperature, in accordance with the present invention. Meanwhile, the multilayer coating film (Comparative Example B2) was obtained by: using, for the uppermost layer and the lower layers, the thermosetting coating materials having the same curing temperature; and curing the uppermost layer and the lower layers by subjecting all the layers to the heat treatment simultaneously. As apparent from the results shown in Table 6, it was found out that all of Wa to Wd of the multilayer coating films of Examples B3 to B5 were respectively more reduced than those of the multilayer coating film of Comparative Example B2, and that the multilayer coating films of Examples B3 to B5 were more improved in both gloss and surface texture than the multilayer coating film of Comparative Example B2.

Moreover, the multilayer coating films (Examples B3 to B5) was obtained by a wet-on-wet technique using, for at least one lower layer below the uppermost layer, the coating material having a relative loss elastic modulus of 1 s$^{-2}$ or less when the uppermost layer-coating material started to gel, in accordance with the present invention. Meanwhile, the multilayer coating film (Comparative Example B2) was obtained by using, for all the lower layers below the uppermost layer, the coating material having a relative loss elastic modulus exceeding 1 s$^{-2}$ when the uppermost layer-coating material started to gel. It was found out that all of Wa to Wd of the multilayer coating films of Examples B3 to B5 were respectively more reduced than those of the multilayer coating film of Comparative Example B2, and that the multilayer coating films of Examples B3 to B5 were more improved in both gloss and surface texture than the multilayer coating film of Comparative Example B2. Particularly, it was found out that all of Wa to Wd of the multilayer coating film (Example B5) obtained by a wet-on-wet technique using, for all the lower layers below the uppermost layer, the coating material having a relative loss elastic modulus of 1 s$^{-2}$ or less when the uppermost layer-coating material started to gel were respectively significantly more reduced than those of the multilayer coating film of Comparative Example B2. Thus, the multilayer coating film of Example B5 was significantly more improved in both gloss and surface texture than the multilayer coating film of Comparative Example B2.

As shown in FIG. 6, by the low-temperature heat treatment, the concentrations V of a volatile component in the multilayer coating films of Examples B3 and B4 were reduced to approximately 3% by mass; that in the multilayer coating film of Example B5 was reduced to approximately 2% by mass; meanwhile, that in the multilayer coating film of Comparative Example B2 was reduced only to approximately 6% by mass. As a result, by the high-temperature heat treatment, as much as approximately 6% by mass of the concentration V of a volatile component was reduced in Comparative Example B2; meanwhile, the reductions in the concentrations V of a volatile component in Examples B3 and B4 were suppressed to approximately 3% by mass, and that in Example B5 was suppressed to approximately 2% by mass. This reduction in the concentration V of a volatile component by the high-temperature heat treatment corresponds to the shrinkage of the multilayer coating film. Accordingly, it was found out that, the shrinkage of the multilayer coating films of Examples B3 to B5 due to the high-temperature heat treatment was certainly restrained in comparison with the multilayer coating film of Comparative Example B2. As a result, the formation (significant existence) of the surface unevenness of the multilayer coating films of Examples B3 to B5 was restrained, all the Wa to Wd thereof became smaller, and the gloss and surface texture thereof were more improved than those of the multilayer coating film of Comparative Example B2.

It should be noted that, it is speculated that the difference in shrinkage amount of the multilayer coating film between Examples and Comparative Examples occurs as follows. In the multilayer coating films of Comparative Examples A1 to A3, the thermosetting base coating materials were used for all the lower layers, and the lower layers were cured by the heat treatment at 140° C. At this time, the melamine resin and the hydroxy groups of the acrylic resin reacted with each other, forming a volatile alcohol and water. On the other hand, in the multilayer coating films of Examples A1 to A4, the noncurable base coating material was used as at least one lower layer. In the heat treatment at 140° C. at which the fluidity of a layer made from the thermosetting and solvent-based clear coating material significantly decreased because of the curing, substantially no curing reaction occurred in the lower layer which was formed from the noncurable base coating material, and thereby no volatile product is formed. As a result, it is speculated that, in Comparative Examples A1 to A3, a volatile product evaporated, and thereby the shrinkage of the coating films was caused; whereas, in Examples A1 to A4, substantially no volatile product was formed, and thus the shrinkage of the coating films was reduced.

Moreover, in the multilayer coating films of Comparative Examples B1 and B2, the thermosetting coating materials that were cured at the same curing temperature were used for the uppermost layer and the lower layer(s). By the high-temperature heat treatment in which the fluidity of the uppermost layer-coating material significantly decreased because of the curing reaction, the uppermost layer and the lower layer(s) were simultaneously cured. At the time of this curing, the melamine resin and hydroxy groups of the acrylic resin were condensed to form a volatile alcohol and water which then evaporated. On the other hand, in the multilayer coating films of Examples B1 to B5, the thermosetting coating material(s) having a curing temperature lower than that of the uppermost layer-thermosetting coating material was used as the lower layer-thermosetting coating material(s) for at least one lower layer below the uppermost layer. The lower layer(s) was cured by the low-temperature heat treatment, and the uppermost layer was cured by the high-temperature heat treatment. At this time, as the lower layer-thermosetting coating material(s), used was: the thermosetting coating material(s) from which substantially no volatile product was formed by the heat treatment; or the thermosetting coating material(s) from which a volatile product such as a blocking agent or a condensation product was formed and evaporated at the time of the curing by the low-temperature heat treatment, but from which a relatively small amount of the volatile product was formed at the time of the subsequent high-temperature heat treatment (particularly, when the fluidity of the uppermost layer-coating material significantly decreased because of the curing reaction). Accordingly, the evaporation of the volatile product was substantially reduced at the time of curing the uppermost layer by the high-temperature heat treatment. As a result, it is speculated that, in Comparative Examples B1 and B2, the coating film shrank by the formation and evaporation of a volatile product at the time of curing the uppermost layer; whereas, in Examples B1 to B5, a small amount of a volatile product evaporated at the time of curing the uppermost layer, and thus the shrinkage of the coating film was reduced.

Furthermore, it is speculated that the difference in unevenness on the surface of the coating film between Examples and Comparative Examples occurs as follows. In the multilayer coating films of Comparative Examples A1 to A3 and Comparative Examples B1 to B2, all the lower layers below the uppermost layer were formed by using, as lower layer-coating materials, the coating materials from which a large amount of solvents and a volatile component which was formed by the curing reaction evaporated at the time of curing the uppermost layer. Accordingly, the multilayer coating film significantly shrank at the time of curing the uppermost layer, and thus numerous unevenness were formed on the surface of the coating film. Besides, these lower layer-coating materials were coating materials having a relative loss elastic modulus exceeding $1\ s^{-2}$ when the uppermost layer-coating material started to gel. Consequently, the fluidity of the lower layers was poor when the uppermost layer started to gel, and thus the numerous unevennesses formed on the surface of the coating film at the time of curing the uppermost layer were not reduced. Accordingly, it is speculated that the numerous unevennesses were left on the surface of the coating film. On the other hand, in the multilayer coating films of Examples A1 to A4 and Examples B1 to B5, the coating material (s) from which a small amount of solvents and a volatile component evaporated at the time of curing the uppermost layer was used as a lower layer-coating material(s) for at least one lower layer below the uppermost layer. Accordingly, the shrinkage of the multilayer coating film at the time of curing the uppermost layer is restrained, and the unevenness is less likely formed on the surface of the coating film. Besides, the lower layer-coating material(s) was the coating material(s) having a relative loss elastic modulus of $1\ s^{-2}$ or less when the uppermost layer-coating material started to gel, which ensured the fluidity of the lower layer(s) even when the uppermost layer started to gel. Accordingly, a few unevennesses formed on the surface of the coating film at the time of curing the uppermost layer were reduced by the flowing of the lower layer(s). Thus, it is speculated that the unevenness on the surface of the coating film was reduced.

Industrial Applicability

As has been described above, according to the present invention, even when two or more kinds of coating materials are applied using a wet-on-wet technique and baked to cure at least the uppermost layer, a multilayer coating film having the uppermost layer with less surface unevenness can be obtained. This makes it possible to obtain a coated article excellent in appearance qualities such as surface texture (surface smoothness) and gloss.

Accordingly, the present invention is useful as a coating method capable of obtaining a coated article excellent in appearance quality even in a case where two or more coating materials are applied using a wet-on-wet technique and baked. Particularly, the present invention is useful as a coating method for bodies or components of automobiles such as passenger cars, trucks, buses and motorcycles.

The invention claimed is:

1. A coating method for forming a multilayer coating film including at least one lower layer formed on a substrate and an uppermost layer formed on the lower layer, the coating method comprising the steps of:
   preparing a noncurable coating material as at least one lower layer-coating material for forming the lower layer of the multilayer coating film;
   preparing a thermosetting coating material as an uppermost layer-coating material for forming the uppermost layer of the multilayer film,
   wherein the noncurable coating material is a coating material having a weight loss percentage of 0.5% by mass or less at a curing temperature of the uppermost layer-coating material;
   forming an uncured multilayer coating film by applying the lower layer-coating material and the uppermost layer-coating material on the substrate using a wet-on-wet technique; and
   curing at least the uppermost layer-coating material by subjecting the uncured multilayer coating film to a heat treatment
   wherein the noncurable coating material undergoes no curing reaction by the heat treatment.

2. The coating method according to claim 1, wherein the noncurable coating material is a coating material containing no curing agent.

3. The coating method according to claim 1, wherein two or more of the lower layers are provided, and all lower layer-coating materials for forming the lower layers are each the noncurable coating material.

4. The coating method according to claim 1, wherein the uppermost layer-coating material is a coating material having a weight loss percentage of 0.5% by mass or less at a curing temperature thereof.

5. The coating method according to claim 1, wherein the uppermost layer-coating material is a coating material that forms no volatile product in the curing reaction by the heat treatment.

6. The coating method according to claim 1, wherein at least the uppermost layer-coating material is cured by reducing a concentration of a volatile component in the uncured multilayer coating film to 3.5% by mass or less, and by then subjecting the uncured multilayer coating film to a heat treatment at a temperature equal to or above a curing temperature of the uppermost layer-coating material −20° C.

7. The coating method according to claim 1, wherein the uncured multilayer coating film is subjected to a heat treatment at a temperature below a curing temperature of the uppermost layer-coating material −20° C and then subjected to a heat treatment at the temperature equal to or above the curing temperature of the uppermost layer-coating material −20° C.

8. A coated article comprising a multilayer coating film including at least one lower layer formed on a substrate and an uppermost layer formed on the lower layer, wherein the coated article is obtained by the coating method according to claim 1.

9. A coating method for forming a multilayer coating film including at least one lower layer formed on a substrate and an uppermost layer formed on the lower layer, the coating method comprising the steps of:
   preparing a thermosetting coating material as an uppermost layer-coating material for forming the uppermost layer, wherein the thermosetting coating material has a curing temperature $T_T$ of 40° C. to 200° C. both inclusive and forms no volatile product in a curing reaction by a heat treatment, and preparing a lower layer-thermosetting coating material as at least one lower layer-coating material for forming the lower layer, wherein the lower layer-thermosetting coating material has a curing temperature $T_U$ that satisfies the following formula (1):

$$T_U \leq T_T - 30 \quad (1)$$

(in the formula (1), $T_U$ represents a curing temperature ° C. of the lower layer-thermosetting coating material, and $T_T$ represents the curing temperature ° C. of the uppermost layer-thermosetting coating material);
   forming an uncured multilayer coating film by applying the lower layer-coating material and the uppermost layer-coating material on the substrate using a wet-on-wet technique;
   setting heating temperatures $T_L$ and $T_H$ that satisfy the following formula (2):

$$T_U - 20 \leq T_L \leq T_T - 30 \quad (2),$$

and the following formula (3):

$$T_T - 20 \leq T_H \leq T_T + 40 \quad (3)$$

(in the formulas (2) and (3), $T_L$ represents a temperature ° C. for low temperature heating, $T_H$ represents a temperature ° C. for high temperature heating, and $T_U$ and $T_T$ are the same as $T_U$ and $T_T$ in the formula (1)); and
   forming a multilayer coating film including the uncured uppermost layer by subjecting the uncured multilayer coating film to the heat treatment at the temperature $T_1$ to thus cure at least the lower layer-thermosetting coating material, and then curing the uppermost layer-thermosetting coating material by subjecting the multilayer coating film including the uncured uppermost layer to the heat treatment at the temperature $T_H$.

10. The coating method according to claim 9, wherein the uppermost layer-thermosetting coating material is a coating material having a weight loss percentage of 0.5% by mass or less at the temperature $T_T$.

11. The coating method according to claim 9, wherein two or more of the lower layers are provided, and all lower layer-coating materials for forming the lower layers are each the lower layer-thermosetting coating material.

12. The coating method according to claim 9, wherein the uppermost layer-coating material is cured by reducing a concentration of a volatile component in the multilayer coating film including the uncured uppermost layer to 4% by mass or less, and by then subjecting the multilayer coating film including the uncured uppermost layer to the heat treatment at the temperature $T_H$.

13. A coated article comprising a multilayer coating film including at least one lower layer formed on a substrate and an uppermost layer formed on the lower layer, wherein the coated article is obtained by the coating method according to claim 9.

14. A coating method for forming a multilayer coating film including at least one lower layer formed on a substrate and an uppermost layer formed on the lower layer, the coating method comprising the steps of:
   preparing a curable coating material as an uppermost layer-coating material for forming the uppermost layer, wherein the curable coating material forms a crosslinked structure by a chemical reaction, and preparing a coating material as at least one lower layer-coating material for forming the lower layer, wherein the coating material has a relative loss elastic modulus of $1\ s^{-2}$ or less when the uppermost layer-coating material starts to gel;

forming an uncured multilayer coating film by applying the lower layer-coating material and the uppermost layer-coating material on the substrate using a wet-on-wet technique; and curing at least the uppermost layer-coating material by subjecting the uncured multilayer coating film to a curing treatment.

15. The coating method according to claim 14, wherein the uppermost layer-coating material is a thermosetting coating material, and the curing treatment is a curing treatment by heating.

16. The coating method according to claim 14, wherein the uppermost layer-coating material is a coating material having a weight loss percentage of 0.5% by mass or less at a curing temperature thereof.

17. The coating method according to claim 14, wherein the coating material having a relative loss elastic modulus of $1\ s^{-2}$ or less is a coating material having a weight loss percentage of 0.5% by mass or less at a curing temperature of the uppermost layer-coating material.

18. The coating method according to claim 14, wherein the coating material having a relative loss elastic modulus of $1\ s^{-2}$ or less is a noncurable coating material that forms no cross-linked structure.

19. The coating method according to claim 14, wherein two or more of the lower layers are provided, and all lower layer-coating materials for forming the lower layers are each the coating material having a relative loss elastic modulus of $1\ s^{-2}$ or less.

20. A coated article comprising a multilayer coating film including at least one lower layer formed on a substrate and an uppermost layer formed on the lower layer, wherein the coated article is obtained by the coating method according to claim 14.

* * * * *

UNITED STATES PATENT AND TRADEMARK OFFICE
CERTIFICATE OF CORRECTION

PATENT NO.       : 8,795,835 B2                                     Page 1 of 1
APPLICATION NO.  : 12/452269
DATED            : August 5, 2014
INVENTOR(S)      : Kazuyuki Tachi et al.

It is certified that error appears in the above-identified patent and that said Letters Patent is hereby corrected as shown below:

In the Claims

Claim 9, lines 7 and 10 of column 48, each occurrence of "$T_u$" should be changed to --$T_U$--; and line 32 of column 48 "$T_l$" should be changed to --$T_L$--.

Signed and Sealed this
Eighteenth Day of November, 2014

Michelle K. Lee
*Deputy Director of the United States Patent and Trademark Office*